United States Patent
Koorapaty et al.

(10) Patent No.: US 6,405,039 B1
(45) Date of Patent: *Jun. 11, 2002

(54) APPARATUS AND METHODS FOR ALLOCATION OF HIGH-PENETRATION SERVICES IN WIRELESS COMMUNICATIONS SYSTEMS

(75) Inventors: Havish Koorapaty, Cary; Ali S. Khayrallah, Apex, both of NC (US)

(73) Assignee: Ericsson Inc. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/295,178

(22) Filed: Apr. 20, 1999

(51) Int. Cl.[7] .................................................. H04Q 7/20
(52) U.S. Cl. ........................ 455/434; 455/435; 455/511; 455/553; 455/509; 455/450; 370/337; 370/347; 370/207; 370/252
(58) Field of Search ............................... 455/434, 403, 455/422, 435, 406, 445, 509, 510, 452, 511, 450; 370/252, 522, 329, 558, 328, 337, 465, 336, 345, 310, 464; 379/114.05, 114.06, 114.07; 375/347, 134, 346

(56) References Cited

U.S. PATENT DOCUMENTS

| 4,446,903 A | 5/1984 | Sewerinson | 371/68 |
| 4,495,619 A | 1/1985 | Acampora | 370/104 |

(List continued on next page.)

FOREIGN PATENT DOCUMENTS

| EP | 0 817 397 A1 | 1/1998 |
| EP | 0 838 964 A2 | 4/1998 |
| WO | WO 98/31165 | 7/1998 |
| WO | WO 98/33346 | 7/1998 |

OTHER PUBLICATIONS

International Search Report, PCT/US99/21463, Feb. 21, 2000.
W.T. Webb, "QAM: the modulation scheme for future mobile radio communications?," Electronics & Communication Journal, Aug. 1992, No. 4, pp. 167–176.

(List continued on next page.)

Primary Examiner—Edward F. Urban
Assistant Examiner—Marceau Milord
(74) Attorney, Agent, or Firm—Myers Bigel Sibley & Sajovec

(57) ABSTRACT

A wireless communications system includes a plurality of base stations that communicate control information with terminals at a first redundancy level over regular control channels. A subset of the plurality of base stations also communicate control information with terminals at a second redundancy level greater than the first redundancy level over high-penetration control channels. The subset of base stations may be distributed to efficiently provide service without using an inordinate amount of channel capacity. In one embodiment, cells served by the plurality of base stations may be grouped into a plurality of groups, e.g., frequency or code reuse groups, such that a respective group of base stations serves a respective group of cells. The subset of base stations may include at least one base station from each group of base stations. The subset of base stations may be geographically distributed with a greater density than the groups of cells to provide improved service to obstructed locations. A voice service may be provided to terminals access the system via a regular control channel, and a message service may be provide to terminals accessing the system via a high-penetration control channel. A terminal for communicating with a such a system includes a receiver operative to receive control information transmitted over a plurality of regular control channels and high-penetration control channels. A controller is operative to scan the receiver over the plurality of regular and high-penetration control channels and to camp the receiver on a selected regular or high-penetration forward control channel based on a measure of communications quality.

61 Claims, 20 Drawing Sheets

U.S. PATENT DOCUMENTS

| | | | |
|---|---|---|---|
| 4,868,758 A | 9/1989 | Kokubu | 705/400 |
| 5,065,393 A | 11/1991 | Sibbitt et al. | 370/360 |
| 5,204,874 A | 4/1993 | Falconer et al. | 375/200 |
| 5,303,297 A | 4/1994 | Hillis | 455/406 |
| 5,313,653 A | 5/1994 | Sasuta | 455/17 |
| 5,341,401 A | 8/1994 | Farjh et al. | 375/94 |
| 5,450,453 A | 9/1995 | Frank | 375/200 |
| 5,465,398 A | 11/1995 | Flammer | 455/69 |
| 5,608,446 A | 3/1997 | Carr et al. | 348/6 |
| 5,612,948 A | 3/1997 | Fette et al. | 379/252 |
| 5,621,737 A | 4/1997 | Bucher | 371/5.1 |
| 5,625,877 A | 4/1997 | Dunn et al. | 455/454 |
| 5,657,325 A | 8/1997 | Lou et al. | 370/334 |
| 5,664,006 A | 9/1997 | Monte et al. | 455/405 |
| 5,666,649 A | 9/1997 | Dent | 455/445 |
| 5,751,799 A | 5/1998 | Mori | 379/114 |
| 5,754,599 A | 5/1998 | Ling et al. | 375/340 |
| 5,828,737 A | 10/1998 | Sawyer | 379/114 |
| 5,884,170 A | 3/1999 | Valentine et al. | 455/433 |
| 5,898,736 A | 4/1999 | Saito et al. | 375/316 |
| 5,909,434 A | 6/1999 | Odenwalder et al. | 370/342 |
| 5,946,356 A | 8/1999 | Felix | 375/295 |
| 5,946,670 A | 8/1999 | Motohashi et al. | 705/400 |
| 5,966,384 A * | 10/1999 | Felix et al. | 370/465 |
| 5,987,076 A | 11/1999 | Zehavi et al. | 375/340 |
| 6,097,937 A | 8/2000 | Sawyer | 455/406 |
| 6,148,208 A | 11/2000 | Love | 455/442 |
| 6,154,643 A | 11/2000 | Cox | 455/406 |
| 6,188,885 B1 | 2/2001 | Kolev et al. | 455/413 |
| 6,212,176 B1 * | 4/2001 | Andersson et al. | 370/347 |
| 6,320,843 B1 * | 11/2001 | Rydbeck et al. | 370/207 |
| 6,324,395 B1 * | 11/2001 | Khayrallah et al. | 455/406 |
| 6,332,006 B1 * | 12/2001 | Rydbeck et al. | 375/262 |

OTHER PUBLICATIONS

Guiliano Benelli, "Two New Coding Techniques for Diversity Communication System," IEEE Transactions on Communications, Sep. 1990, No. 9, pp. 1530–1538.

International Search Report, PCT/US99,21128, Jan. 17, 2000.

Matthews, Adrian, "Application of IS–136 to Personal Communication Services,"IEEE, 1996, Published Apr. 30, 1996, pp. 223–228.

International Search Report, PCT/US00/07105, Jul. 6, 2000.

International Search Report, PCT/US00/08279, Aug. 1, 2000.

* cited by examiner

FIG. 12B

APPARATUS AND METHODS FOR ALLOCATION OF HIGH-PENETRATION SERVICES IN WIRELESS COMMUNICATIONS SYSTEMS

FIELD OF THE INVENTION

The present invention relates to wireless communications systems and methods, and more particularly, to systems and methods for providing services in wireless communication systems.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have been long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95,-lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a conventional terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Traditional analog cellular systems generally employ a system referred to as frequency division multiple access (FDMA) to create communications channels. As a practical matter well known to those skilled in the art, radiotelephone communications signals, being modulated waveforms, typically are communicated over predetermined frequency bands in a spectrum of carrier frequencies. In a typical FDMA system, each of these discrete frequency bands serves as a channel over which cellular radiotelephones communicate with a cell, through the base station or satellite serving the cell.

The limitations on the available frequency spectrum present several challenges as the number of subscribers increases. Increasing the number of subscribers in a cellular radiotelephone system may require more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of channels available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system having only several hundred allocated frequency bands.

Another technique which can further increase system capacity and spectral efficiency is the use of time division multiple access (TDMA). A TDMA system may be implemented by subdividing the frequency bands employed in conventional FDMA systems into sequential time slots. Communications over a frequency band typically occur on a repetitive TDMA frame structure that includes a plurality of time slots. Examples of systems employing TDMA are those conforming to the IS-136 standard, in which each of a plurality of frequency bands are subdivided into 3 time slots, and systems conforming to the GSM standard, which divides each of a plurality of frequency bands into 8 time slots. In these TDMA systems, each user communicates with the base station using bursts of digital data transmitted during assigned time slots.

A channel in a TDMA system typically includes at least one time slot on at least one frequency band. Typically included among the channels in a TDMA system are dedicated control channels, including forward (downlink) control channels for conveying information from a base station to subscriber terminals, and reverse control channels for conveying information from subscriber terminals to a base station. The information broadcast on a forward control channel may include such things as a cell's identification, associated network identification, system timing information and other information needed to access the wireless system from a subscriber unit and to manage radio resources in the system. Reverse control channels are typically used for transmitting access requests from subscriber terminals. A channel used for this purpose may be referred to as random access channel (RACH).

An exemplary slot allocation, in particular, one utilized by wireless systems complying with the IS-136 standard, is illustrated in FIG. 3. For groups of three repeating slots on the uplink and downlink carrier frequency bands used by a base station, a "slot pair" on one pair of uplink and downlink carrier frequency bands is reserved for the provision of a forward Digital Control Channel (FDCCH), and a reverse DCCH (RDCCH), with other slots being assigned to Digital Traffic Channels (DTCs).

As illustrated in 4, the FDCCH has a plurality of "logical channels" mapped thereon, including a multiplexed Broadcast Channel (BCCH) designed to convey information about system configuration and system access rules, and a multiplexed point-to-point short message service (SMS), paging and access response channel (SPACH). The BCCH is further divided into a Fast Broadcast Channel (F-BCCH) for conveying time-critical information such as system identification (ID) and registration information, an Extended Broadcast Channel (E-BCCH) for conveying less time critical information such as neighboring cell lists, and an SMS Broadcast Channel (S-BCCH). The SPACH comprises a short message service channel (SMSCH) for carrying messages, a paging channel (PCH) for conveying system pages, and an access response channel (ARCH) for providing system response to queries from subscriber units and other administration information. The RDCCH is used to provide a Random Access Channel (RACH), which is used by terminals to transmit requests to access the wireless system.

Wireless systems typically provide control information over FDCCHs and RDCCHs. As illustrated in FIG. 5, a Layer 1 (Physical Layer) message transmitted over the FDCCH typically is constructed from a Layer 3 message that is broken down into Layer 2 frames, a respective one of which is transmitted during a respective slot after convolutional coding and interleaving. Each Layer 1 FDCCH message includes coded Layer 3 data, along with a synchronization information (SYNC) field and a Coded Superframe Phase (CSFP) field that indicates the position of the FDCCH slot in a Superframe.

The FDCCH message also includes a Shared Channel Feedback (SCF) field that contains information about the reservation status of an associated RDCCH RACH. The reservation status information in SCF field includes a Busy/Reserved/Idle (BRI) field that indicates whether the corresponding RDCCH RACH is busy, reserved or idle. A Received/Not Received (R/N) field indicates whether a RACH burst was received on the corresponding RACH. A Coded Partial Echo (CPE) field may be used to identify a terminal for which a RACH burst has been successfully received.

Wireless communications systems are often subject to environmental effects that can render system access difficult. A wireless call which could be placed under system operating parameters that are designed to produce an acceptable level of communications quality under a set of nominal environmental conditions, may not be possible under "subnominal" conditions of fading, shadowing by intervening objects such as hills, and attenuation by distance and by structures such as buildings.

High-penetration messaging and paging solutions have been proposed that allow a base station to transmit a short alphanumeric message to a terminal in a disadvantaged location, such as in a "hole" between coverage areas or within a building or tunnel, using a high-penetration control channel. In response to the receipt of such a high-penetration short message, the mobile terminal can transmit a similar high-penetration acknowledgment, and later move to a less disadvantaged location and call back the calling party identified in the short message. Examples of high-penetration messaging services are described in U.S. patent application Ser. No. 09/193,261(Rydbeck et al., filed Nov. 18, 1998), U.S. patent application Ser. No. 09/195,790(Rydbeck et al., filed Nov. 18, 1998), and U.S. patent application Ser. No. 09/195,315(Khayrallah et al., filed Nov. 18, 1998), each of which are assigned to the assignee of the present invention. However, because such high-penetration services may utilize spectral resources that might otherwise be used for voice traffic, there is a need for improved techniques for efficiently providing such services.

SUMMARY OF THE INVENTION

In light of the foregoing, it is an object of the present invention to provide apparatus and methods for efficiently providing regular and high-penetration services in wireless communications systems.

This and other objects, features and advantages are provided, according to the present invention, by apparatus (systems) and methods in which a plurality of base stations (e.g., omnidirectional base stations, base stations serving multiple sector cells, or similar transmitter/receiver units) of a wireless communications system includes a subset of base stations that communicate with terminals over both regular control channels, e.g. Digital Control Channels (DCCHs), at a first redundancy level and over high-penetration control channels, e.g., high-penetration Digital Control Channels (HP-DCCHs) at a second redundancy level greater than the first redundancy level. For example, cells (sectors) served by the base stations of the system may be organized into groups, such as frequency or code reuse groups, such that a respective group of base stations serves a respective group of cells. The subset of base stations providing high-penetration control channels may include at least one base station from each group, such that high-penetration services may be effectively provided without using an inordinate amount of channel capacity for high-penetration control channels. Base stations providing high-penetration control channels may also be distributed more densely than the groups of cells in order to provide enhanced coverage in obstructed locations such as interior spaces in buildings. According to another aspect of the present invention, higher capacity high-penetration messaging may also be provided over a traffic channel for a terminal accessing the wireless system via a high-penetration control channel. According to yet another aspect of the present invention, candidate regular and high-penetration control channels may be identified in Neighbor Cell Messages transmitted over regular and high-penetration control channels to guide terminal scanning and control channel camping.

In particular, according to the present invention, a wireless communications system includes a plurality of base stations that communicate with terminals over physical channels. The plurality of base stations communicates control information with terminals at a first redundancy level over regular control channels mapped onto the physical channels. The plurality of base station includes a subset of base stations that also communicate control information with terminals at a second redundancy level greater than the first redundancy level over high-penetration control channels mapped onto the physical channels.

According to an aspect of the present invention, the subset of base stations providing both regular and high penetration control channels is distributed to efficiently provide service without using inordinate channel capacity. A base station of the subset of the plurality of base stations communicates over a regular control channel with terminals located in a first coverage area and communicates over a high-penetration control channel with terminals located in a second coverage area larger than the first coverage area. In one embodiment, cells served by the plurality of base stations may be grouped into a plurality of groups, such as frequency reuse or code reuse groups, such that a respective group of base stations serves a respective group of cells. The subset of the plurality of base stations may include at least one base station from each group. The base stations of the subset of the plurality of base stations may also be geographically distributed with a greater density than the groups to thereby provide improved service to obstructed locations.

According to another aspect of the present invention, a base station of the plurality of base stations provides a voice service to a terminal accessing the system via a regular control channel, and wherein a base station of the subset of the plurality of base stations provides a message service to a terminal accessing the system via a high-penetration control channel. The message service may be provided over a high-penetration forward control channel, or may be provided over a traffic channel.

According to another aspect of the present invention, a terminal for communicating with a wireless communications system over physical channels includes a receiver operative to receive control information transmitted over a plurality of regular control channels and high-penetration control channels, the receiver operative to receive control information at a first redundancy level over the regular control channels and to receive control information at a second redundancy level greater than the first redundancy level over the high-penetration control channels. A controller is operatively associated with the receiver and operative to scan the receiver over the plurality of regular and high-penetration control channels and to camp the receiver on a selected regular or high-penetration forward control channel based on a measure of communications quality.

In embodiments according to this aspect, the receiver is operative to receive information over a regular or a high-penetration control channel that identifies a plurality of candidate regular and high-penetration control channels. The controller is operative to scan the receiver over the plurality of candidate regular and high-penetration control channels. The controller may be operative to transition the receiver to camping on one of the candidate regular control channels when communications quality for the one candidate regular control channel meets a predetermined criterion. The controller may also be operative to transition the receiver from camping on a first regular control channel to camping on a second regular control channel selected from the plurality of candidate regular and high-penetration control channels when communications quality for the second regular control channel exceeds communications quality for the first regular control channel. The controller may be further operative to transition the receiver from camping on a regular control channel to camping on a high-penetration control channel selected from the plurality of candidate regular and high-penetration control channels when communications quality for the regular control channel and for the candidate regular control channels of the plurality of regular and high-penetration control channels is unacceptable. The controller may also be operative to transition the receiver from camping on a high-penetration control channel to camping on one of the candidate regular control channels when communications quality on the candidate regular channel meets a predetermined criteria.

Operating methods for wireless communications systems and terminals are also described. Improved wireless communications services may thereby be provided.

BRIEF DESCRIPTION OF THE DRAWINGS

FIGS. 11A–11B and 12A–12B illustrate respective exemplary superframe/hyperframe structures for high-penetration forward and reverse control channels according to embodiments of the present invention.

DETAILED DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The following discussion relates to allocation of high-penetration messaging services in a manner consistent with the existing IS-136 standards. The embodiments described herein specifically relate to exemplary systems which provide high-penetration access via high-penetration forward and reverse control channels as described in a United States Patent entitled "APPARATUS AND METHODS FOR HIGH-PENETRATION RANDOM ACCESS IN WIRELESS COMMUNICATIONS SYSTEMS," by Koorapaty et al., assigned to the assignee of the present invention, filed concurrently herewith and incorporated by reference herein in its entirety. The apparatus (systems) and methods described herein are also applicable to a variety of other high-penetration services, such as the IS-136 compliant high penetration messaging services described in the aforementioned U.S. patent application Ser. No. 09/193,261(Rydbeck et al., filed Nov. 18, 1998), U.S. patent application Ser. No. 09/195,790(Rydbeck et al., filed Nov. 18, 1998), and U.S. patent application Ser. No. 09/195,315 (Khayrallah et al., filed Nov. 18, 1998), each of which are assigned to the assignee of the present invention and are incorporated by reference herein in their entirety. It will be understood that apparatus and methods of the present invention are applicable to non-IS-136 compliant systems as well.

High-Penetration Random Access

Figure 1:
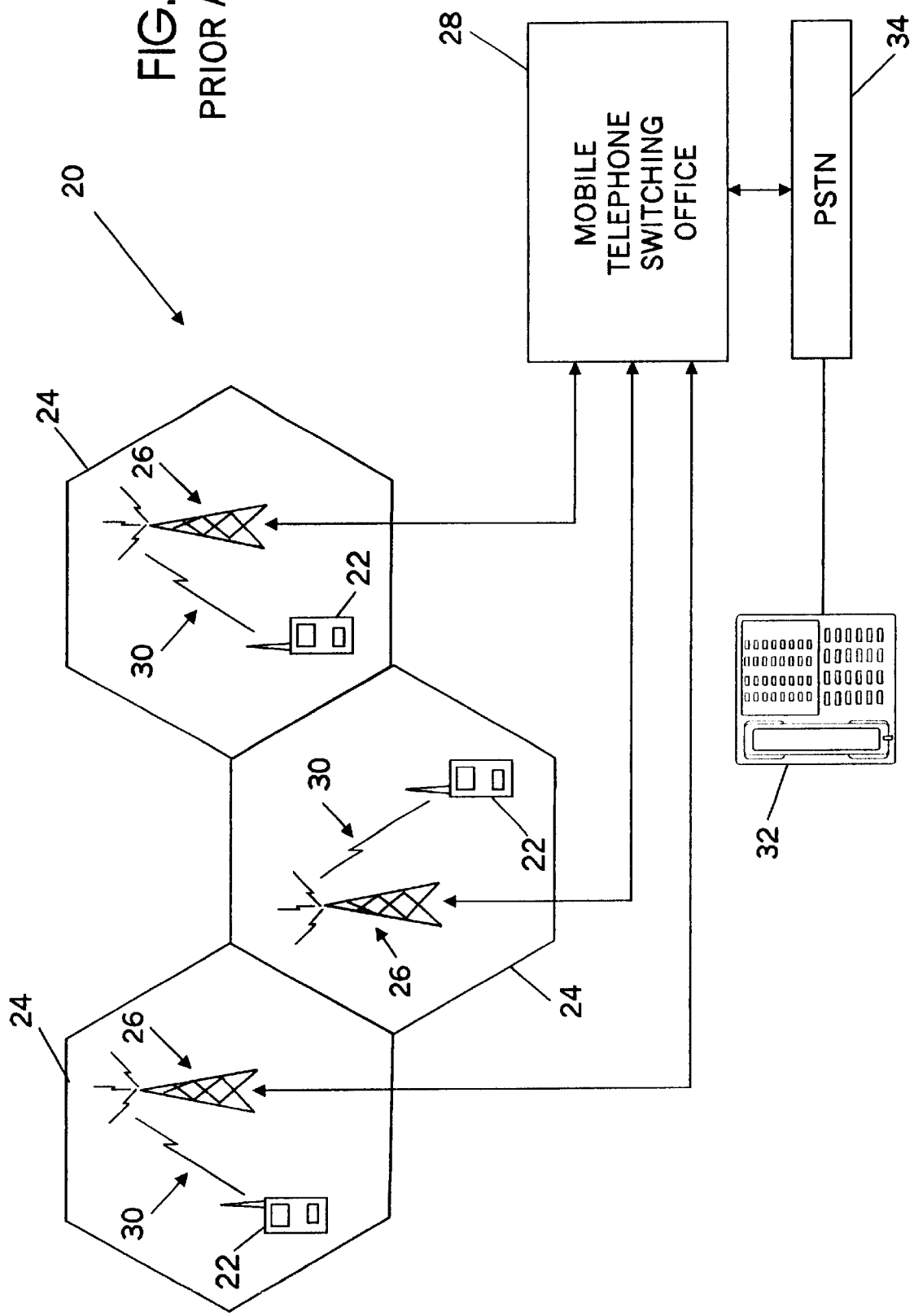
FIG. 1 illustrates a terrestrial wireless communications system according to the prior art.
Figure 2:
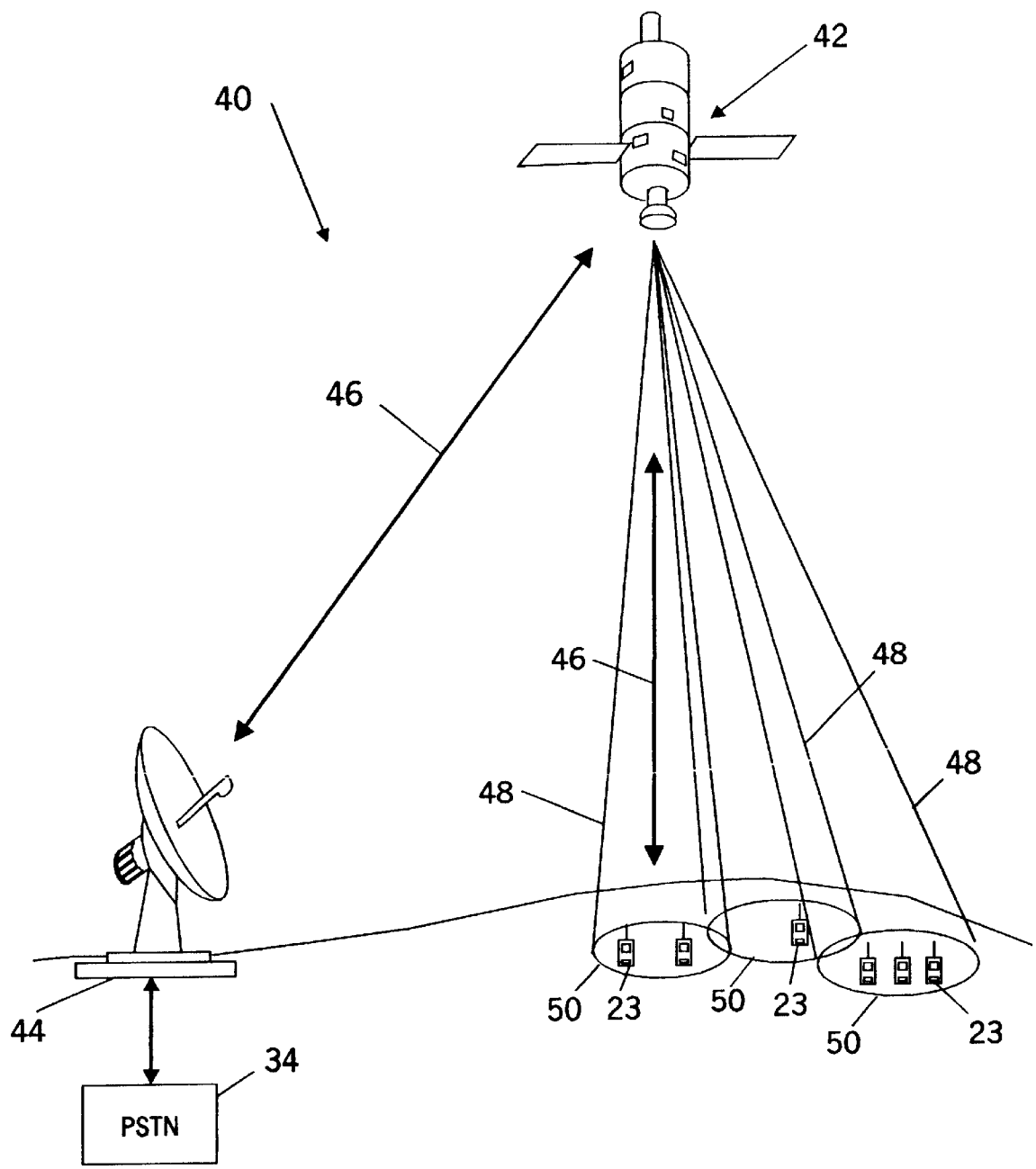
FIG. 2 illustrates a satellite-based wireless communications system according to the prior art.
Figure 3:
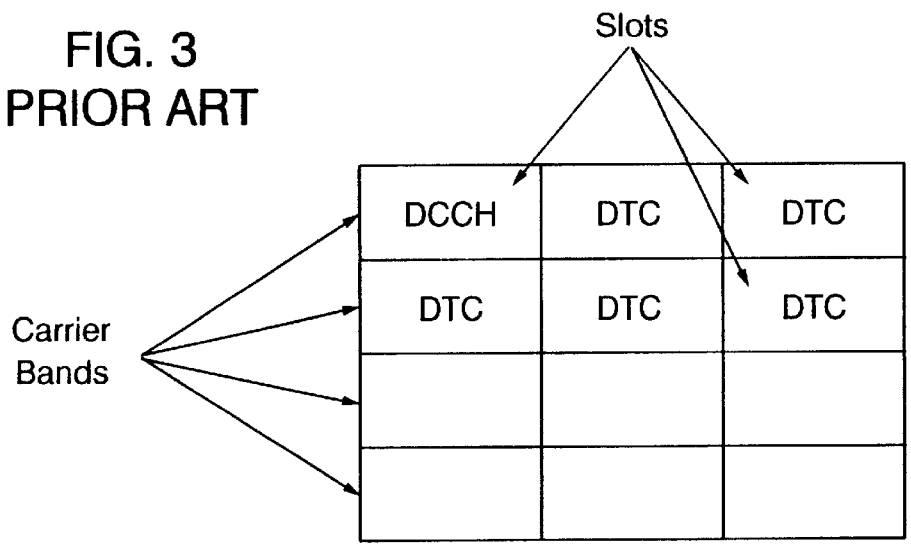
FIG. 3 illustrates physical channel assignment for a time division multiple access (TDMA) wireless communications system according to the prior art.
Figure 4:
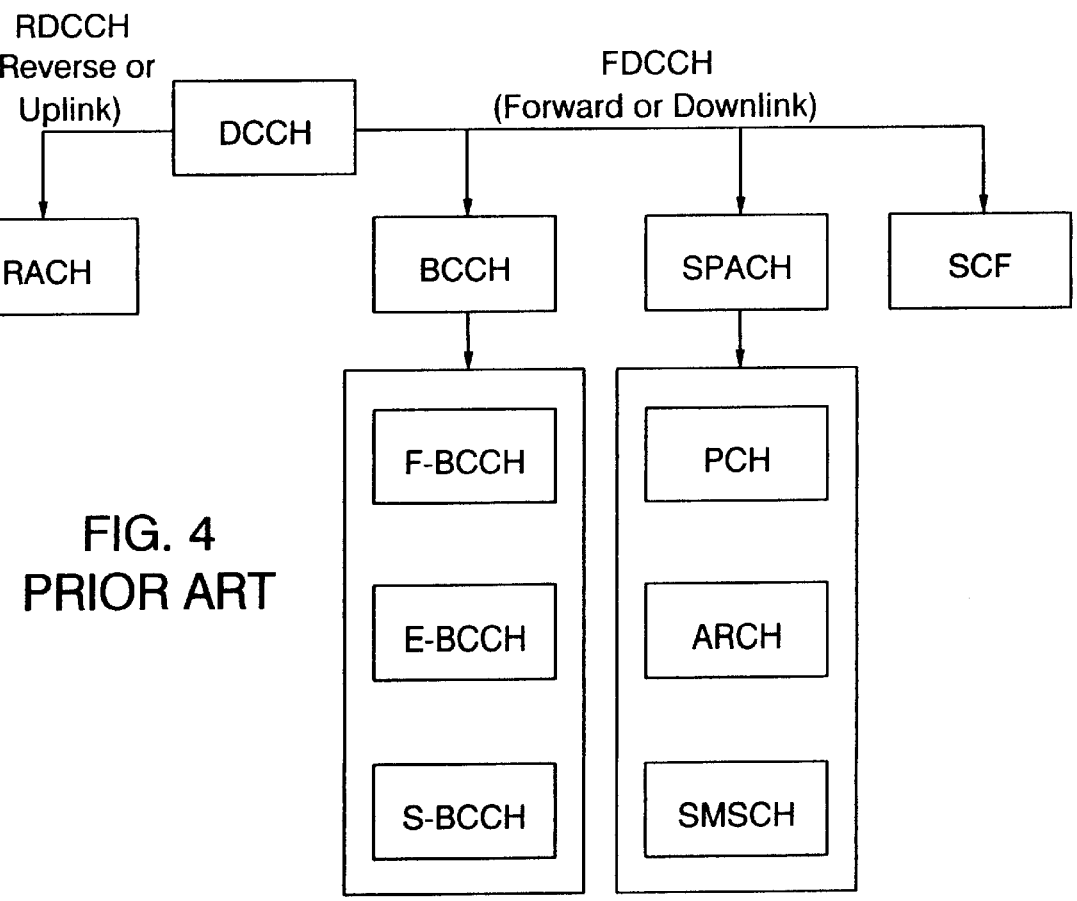
FIG. 4 illustrates logical control channel assignments for a wireless communications system according to the prior art.
Figure 5:
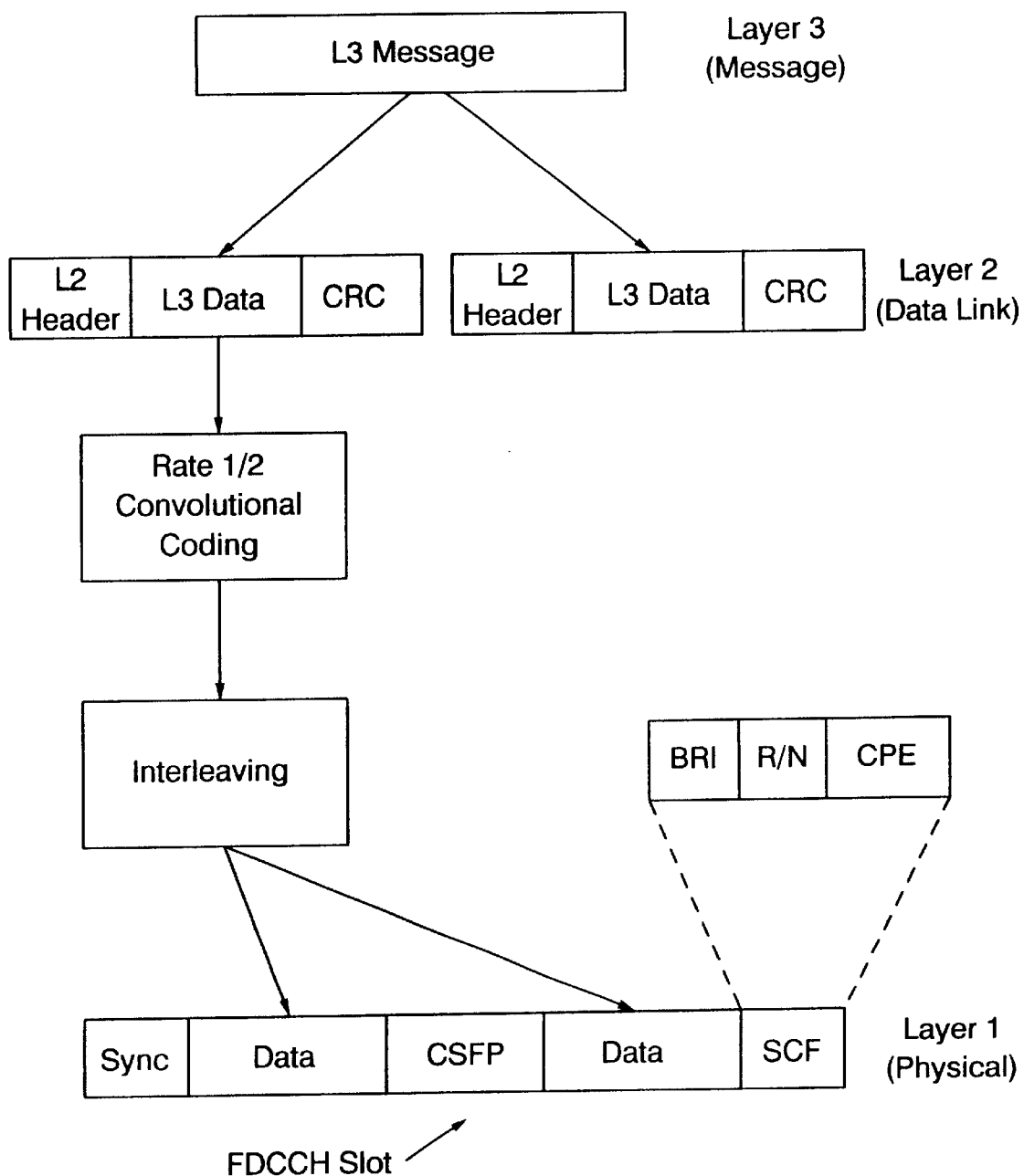
FIG. 5 illustrates a protocol stack for a Forward Digital Control Channel (FDCCH) according to the prior art.
Figure 6:
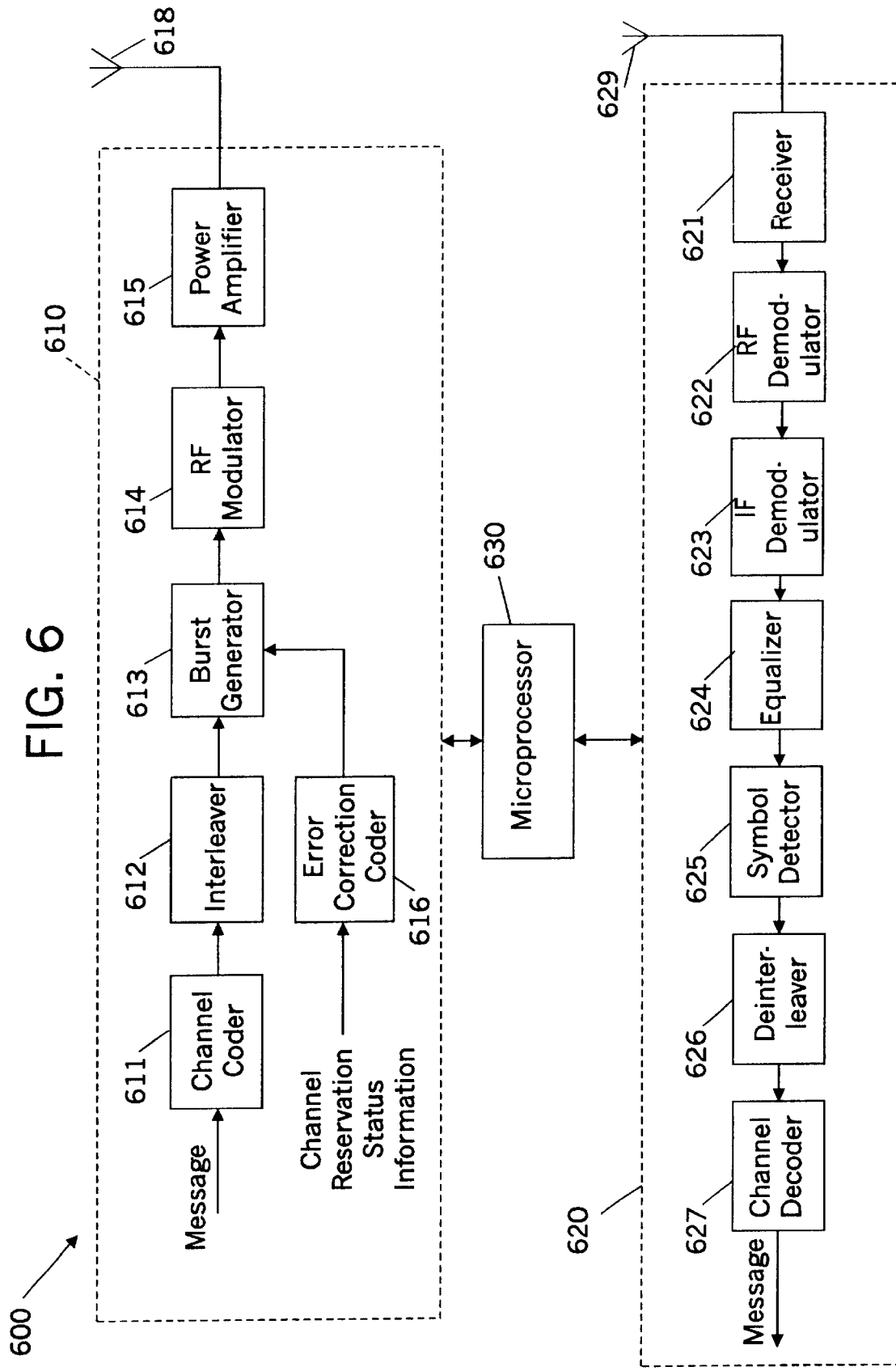
FIGS. 6 and 7 illustrate exemplary transceiver apparatus according to embodiments of the present invention.

FIG. 6 illustrates a transceiver 600 in which methods and apparatus of the present invention can be embodied. The transceiver 600 may be utilized in a base station such as the base stations 26 illustrated in FIG. 1 or a satellite base station such as the satellite base station 42 illustrated in FIG. 2 to receive access requests and responsively transmit channel reservation status information over a high-penetration reverse and forward control channels. A receiver section 620 recovers access requests from radio signals received from an antenna 629 over a plurality of slots assigned to a reverse control channel. The receiver section 620 includes a receiver 621 that receives radio frequency (RF) signals from the antenna 629. The received signals are passed on to an RF demodulator 622 that downconverts the carrier-modulated signal to produce an intermediate frequency signal that is further demodulated and equalized by an intermediate frequency (IF) demodulator 623 and an equalizer 624, respectively. Symbols are then detected from baseband samples produced from the equalizer 624 by a symbol detector 625. The detected symbols are then deinterleaved and decoded by a deinterleaver 626 and a channel decoder 627. The receiver 621, RF demodulator 622, IF demodulator 623, equalizer 624, symbol detector 625, deinterleaver 626, and channel decoder 627 are operatively associated with a microprocessor 630 or similar device for control and other functions.

A transmitter section 610 processes an input message, e.g., a Layer 2 frame, and transmits corresponding radio frequency bursts in a plurality of slots assigned to a high-penetration forward control channel. The transmitter section 610 includes a channel coder 611 that encodes the message according to an error correction code, followed by an interleaver 612 that interleaves the coded message data. The coded and interleaved data is then fed to a burst generator 613, where synchronization information is added, along with coded reservation status information produced by an error correction coder 616, e.g., a coder which applies a combination of a convolutional code and a block code as described in greater detail below. The reservation status information may, for example, include information identifying a terminal from which an access request burst has been received by the receiving section 620. The formatted bursts are passed to an RF modulator 614 in which the data is modulated by a radio frequency carrier. The modulated signal is then amplified by a power amplifier 615 and transmitted by a radio antenna 618. The channel coder 611, interleaver 612, burst generator 613, RF modulator 614, power amplifier 615 and error correction coder 616 are operatively associated with the microprocessor 630 for control and other functions.

Figure 7:
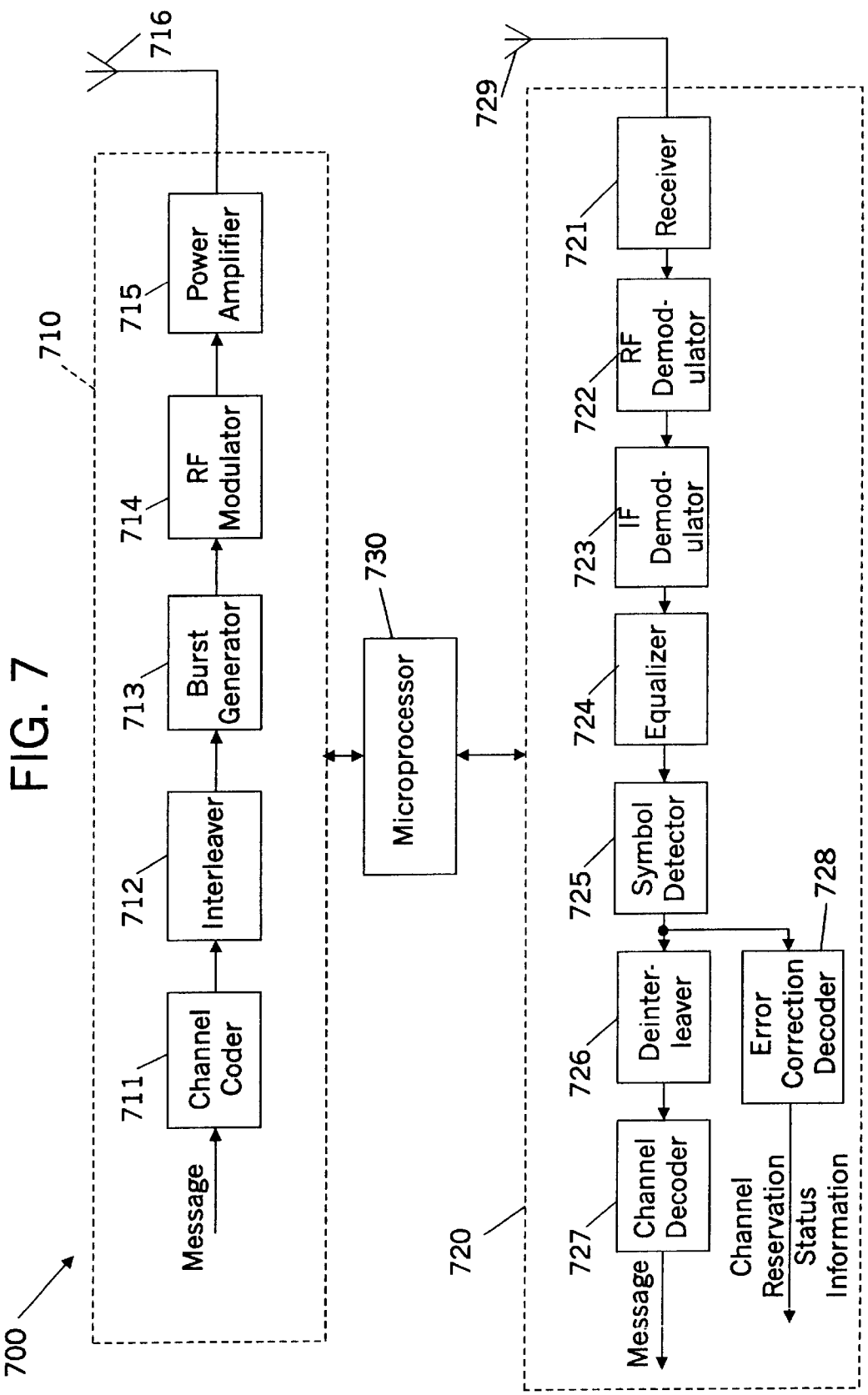

FIG. 7 illustrates a transceiver 700 in which methods and apparatus of the present invention can be embodied. The transceiver 700 may be utilized in a mobile or other terminal, such as the terminals 22, 23 of FIGS. 1 and 2, to transmit access requests and/or other messages, such as alphanumeric short messages, and to receive channel reservation status information and/or other messages, over high-penetration forward and reverse control channels. A receiver section 720 recovers channel reservation status information from radio signals received from an antenna 729 over a plurality of slots assigned to a reverse control channel. The receiver section 720 includes a receiver 721 that receives radio frequency signals from the antenna 729. The received signals are passed on to an radio frequency (RF) demodulator 722 that downconverts the carrier-modulated signal to produce an intermediate frequency signal that is further demodulated and equalized by an IF demodulator 723 and an equalizer 724, respectively. Symbols are then detected from baseband samples by a symbol detector 725. Detected symbols corresponding to a transmitted message are deinterleaved and decoded by a deinterleaver 726 and a channel decoder 727, respectively. Detected symbols corresponding to error correction coded channel reservation information are separately decoded in an error correction decoder 728. The receiver 721, RF demodulator 722, IF demodulator 723, equalizer 724, symbol detector 725, deinterleaver 726, channel decoder 727, and error correction decoder 728 are operatively associated with a microprocessor 730 for control and other functions.

A transmitter section 710 processes an input message, e.g., a Layer 2 access request message, and transmits corresponding radio frequency bursts in a plurality of slots assigned to a high-penetration reverse control channel. The transmitter section 710 includes a channel coder 711 that encodes the message according to an error correction code, followed by an interleaver 712 that interleaves the coded message data. The coded and interleaved data is then fed to a burst generator 713, where synchronization and other information is added. The formatted bursts are passed to an RF modulator 714 in which the data is modulated by a radio frequency carrier. The modulated signal is then amplified by a power amplifier 715 and transmitted by a radio antenna 716. The channel coder 711, interleaver 712, burst generator 713, RF modulator 714, and power amplifier 715 are operatively associated with the microprocessor 730 for control and other functions.

Those skilled in the art will appreciate that the components illustrated in FIGS. 6 and 7 may, in general, be implemented using special purpose hardware, software or firmware executing on general or special purpose hardware, and combinations thereof. Those skilled in the art will appreciate that, in addition to providing apparatus for transmitting and receiving high-penetration channel reservation status indicators and access requests, components of the transceivers 600, 700 may also be used for transmitting and receiving "regular" channel reservation status indicators and access requests. For example, the transceivers 600, 700 may by (and preferably are) used to transmit and receive "regular" FDCCH bursts (including SCF-based channel reservation status indicators) and "regular" RACH bursts as specified under IS-136 by, for example, disabling or bypassing functions of the error correction coder 616 and the error correction decoder 728. It will further be understood that, in addition to channel reservation status indicators, access response (ARCH) and other messages may also be received transmitted by the transceiver 600 or received by the transceiver 700 over a forward control channel. Similarly, in addition to access requests, alphanumeric short messages or other messages may be transmitted by the transceiver 700 and received by the transceiver 600 over a reverse control channel. It will also be understood that the receiver and transmitter architectures illustrated in FIGS. 6 and 7 are provided for exemplary purposes, and that numerous alternatives to or variations of these architectures may be used with the present invention.

Figure 8:
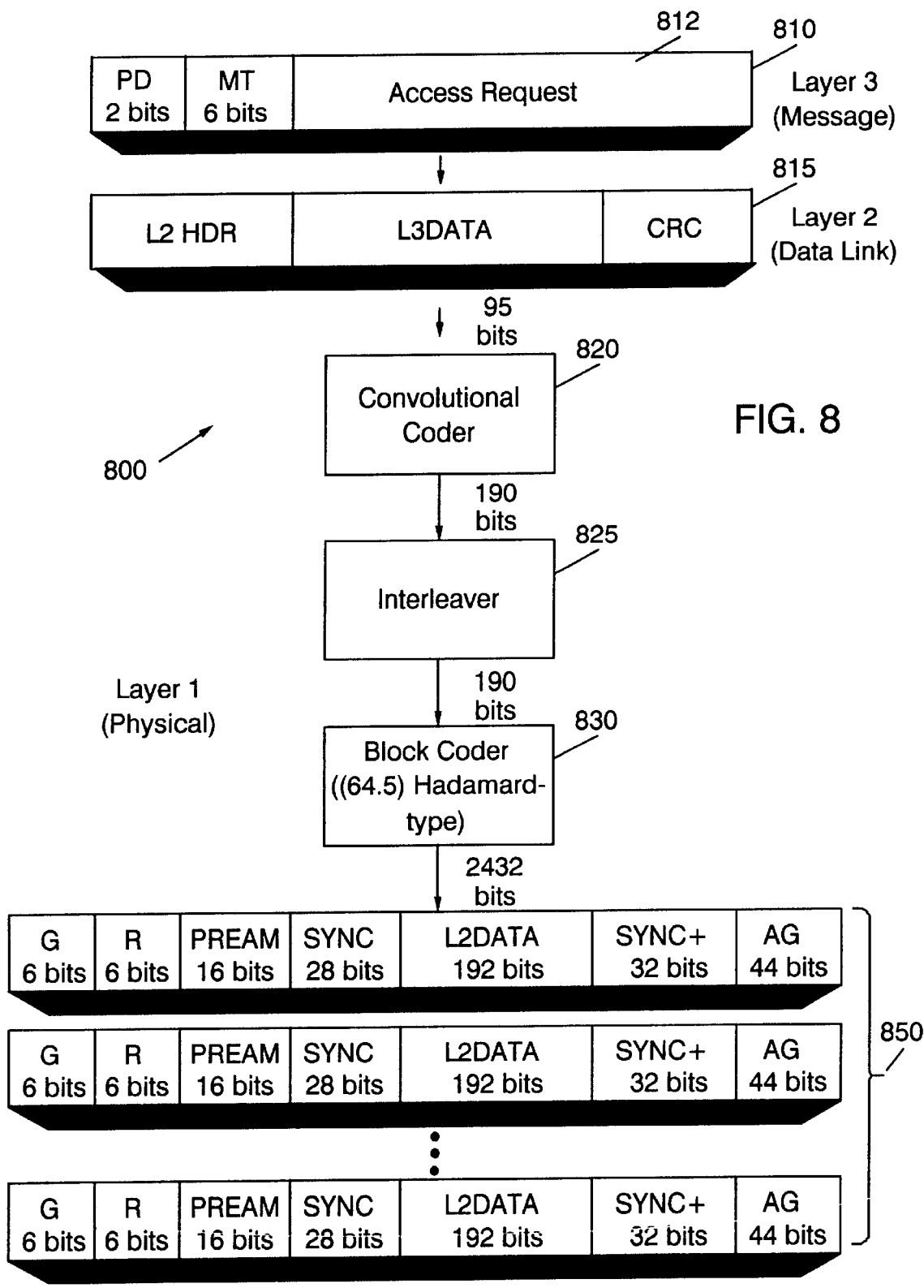
FIGS. 8 and 9 illustrate exemplary protocols for transmitting messages over high-penetration reverse and forward control channels according to embodiments of the present invention.
Figure 9:
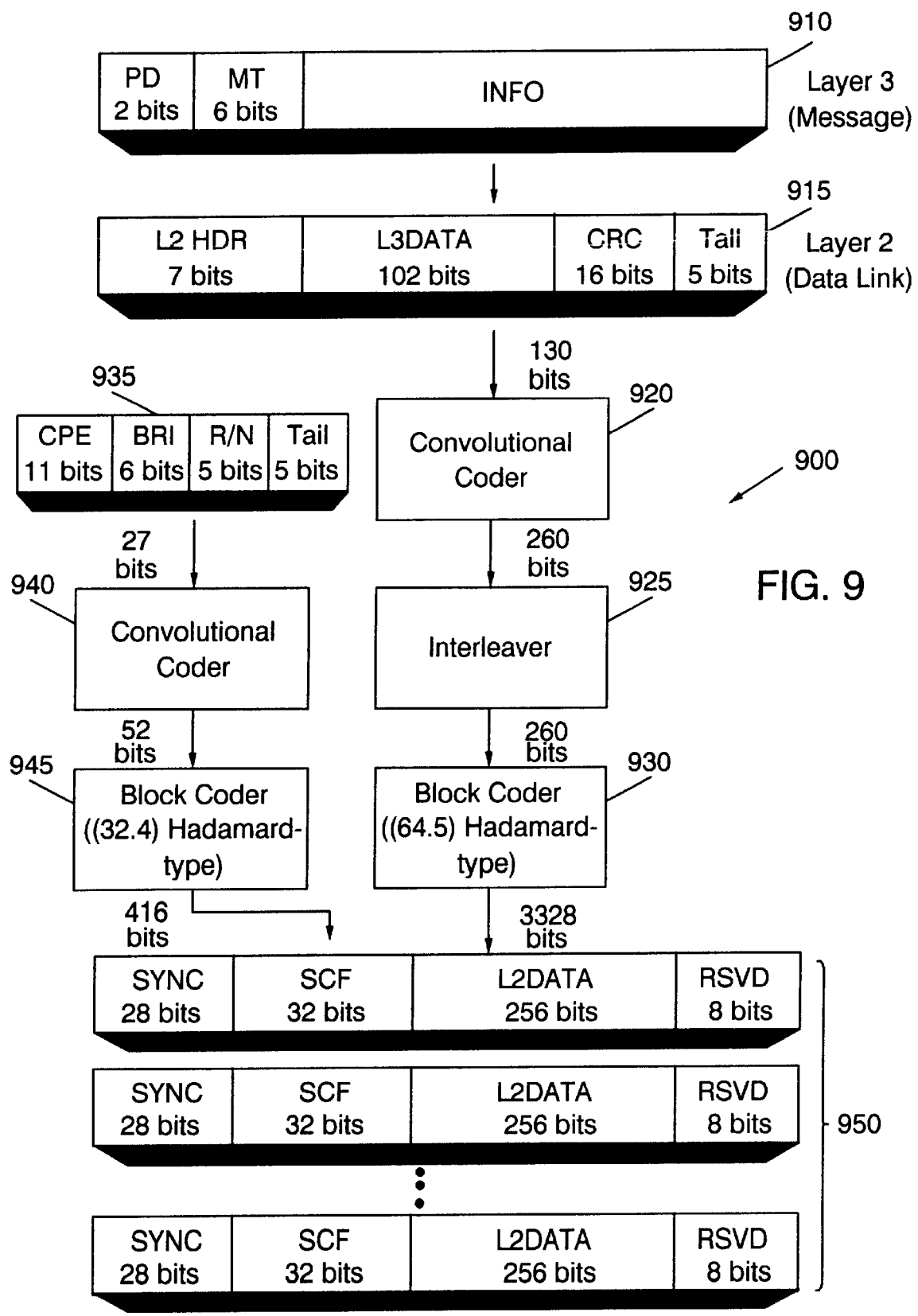
Figure 10:
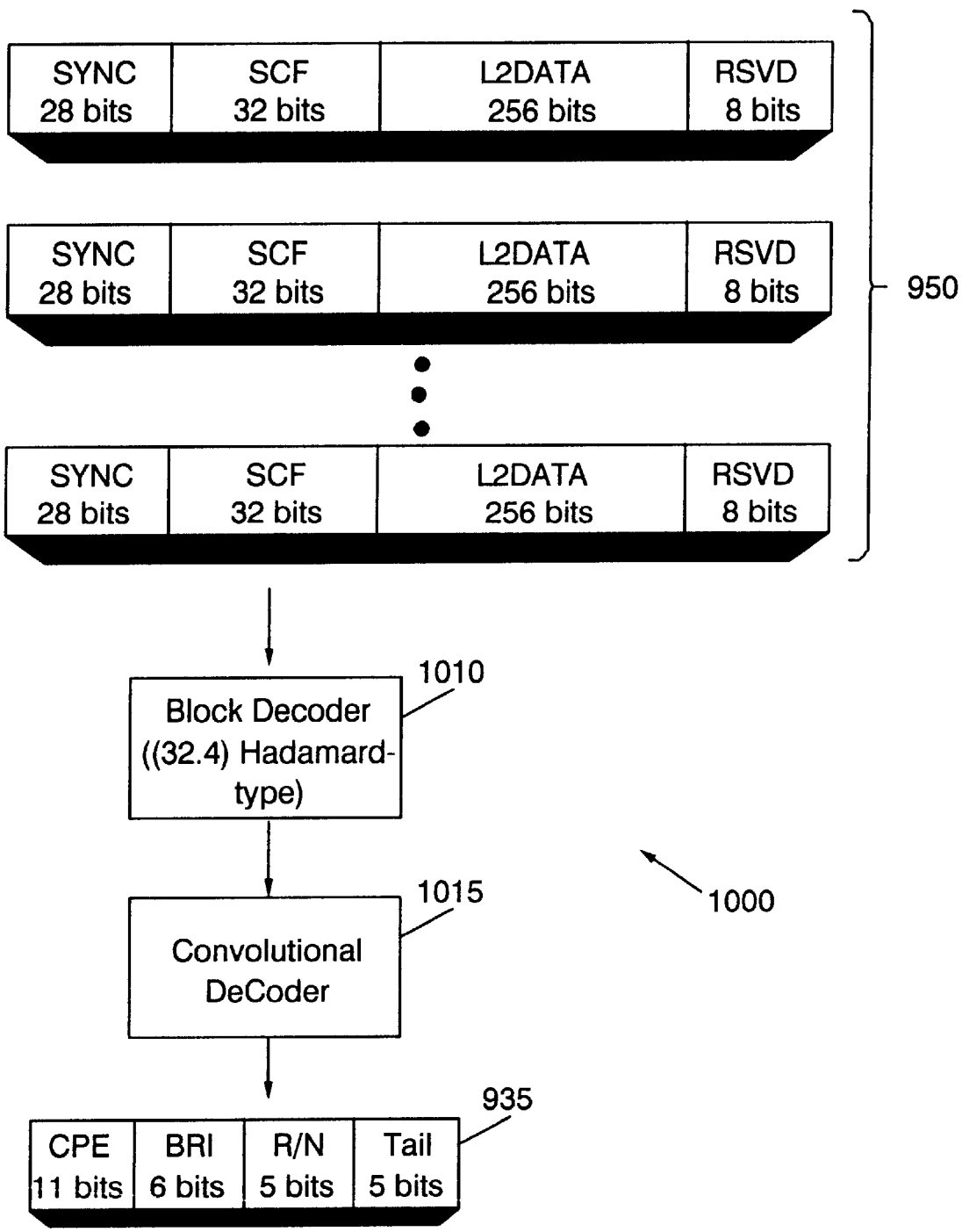
FIG. 10 illustrates an exemplary protocol for receiving message transmitted over a high-penetration forward control channel according to an embodiment of the present invention.

FIGS. 8–10 are protocol diagrams that illustrate exemplary operations for providing high-penetration random access in a wireless communications system according to aspects of the present invention. It will be generally understood that the operations illustrated in FIGS. 8–10 may be embodied in special purpose hardware, in software or firmware executing on special or general purpose hardware, and in combinations thereof, including in computer program instructions which may be loaded onto a computer or other programmable data processing apparatus to produce a machine such that the instructions which execute on the computer or other programmable data processing apparatus create means for implementing the functions specified in the flowchart block or blocks. For example, the functions of FIGS. 8–10 may be implemented as computer instructions that are loaded and executed by microprocessors such as those illustrated in FIGS. 6 and 7, positioned in wireless terminals such as the terminals 22, 24 of FIGS. 1 and 2, or in a base stations such as the base stations 26 or satellite 42 illustrated in FIGS. 1 and 2. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the protocol diagrams. Accordingly, the protocol diagrams of FIGS. 8–10 support combinations of means for performing the specified functions and combinations of steps for performing the specified functions.

FIG. 8 illustrates exemplary operations 800 for constructing Layer 1 (Physical Layer) access request bursts for transmission in a plurality of slots assigned to a high-penetration reverse control channel, more particularly, for constructing a plurality of Layer 1 access request bursts for a High-Penetration Reverse Digital Control Channel (HP-RDCCH) consistent with the IS-136 standard. A Layer 3 (Message Layer) message 810 includes an access request 812, along with a Protocol Discriminator (PD) field PD and a Message Type (MT) field MT. The Layer 3 message is included in a data field L3DATA of a Layer 2 (Data Link Layer) frame 815, which also includes Layer 2 Header L2HDR and a Cyclic Redundancy Check (CRC) value CRC. Each Layer 2 frame 815 is then processed by a rate ½, memory 5 convolutional coder 820, and then interleaved by an interleaver 825. The convolutionally coded and interleaved information is then subjected to an additional block coding in a block coder 830, preferably a (64, 5) Hadamard-type block coder, i.e., a (32, 5) Hadamard code modified by bit repetition, to produce data that is placed into data fields L2DATA of a plurality of Layer 1 messages 835. Also included in each Layer 1 message 835 are guard bit fields G, AG, a reserved field R, a Preamble field PREAM, and synchronization fields SYNC, SYNC+.

As shown, the block coder 830 maps the 190 bits of convolutionally coded and interleaved Layer 2 data into 2432 bits of block coded data (38 64-bit block code words). This additional coding can provide increased link margin for the transmitted information on the order of 10 dB. As each Layer 1 message 835 includes only 192 bits of data, each Layer 2 message 815 requires at least 13 Layer 1 messages 835, i.e., at least 13 bursts in at least 13 slots. As the IS-136 standard specifies π/4 shifted, Differentially encoded Quadrature Phase Shift Keying (π/4 DQPSK) modulation, the (64,5) Hadamard block coding 830 (corresponding to a (32,5) Hadamard code with bit repeats) maps the convolutionally coded and interleaved bits to a restricted symbol subset of the π/4 DQPSK modulation constellation. This mapping enables a receiving unit to perform noncoherent demodulation by simply applying a π/4 derotation on the phase of a transmitted symbol with respect to a previously received symbol, followed by Hadamard decoding and convolutional decoding. These concepts are described in the aforementioned U.S. patent application Ser. No. 09/193,261 (Rydbeck et al., filed Nov. 18, 1998) and U.S. patent application Ser. No. 09/195,790(Rydbeck et al., filed Nov. 18, 1998), both of which are assigned to the assignee of the present invention and are incorporated by reference herein in their entirety.

FIG. 9 illustrates operations for constructing a plurality of control channel bursts for transmission in a plurality of slots assigned to a high-penetration forward control channel corresponding to the high-penetration reverse control channel of FIG. 8, more particular, for constructing bursts for a High-penetration Forward Digital Control Channel (HP-FCDDH) that is consistent with the IS-136 standard. A Layer 3 message 910 includes an information field INFO, along with a PD field PD and a MT field MT. The Layer 3 message 910 is included in a data field L3DATA of a Layer 2 frame 915, which also includes a header field L2HDR, a CRC value field CRC, and tail bits TAIL. Each Layer 2 frame 915 is processed by a convolutional coder 920, an interleaver 925, and a block coder 930 that preferably applies a (64,5) Hadamard code as described above. The block coder 930 maps the 260 convolutionally coded and interleaved bits of a Layer 2 frame 915 into 3328 bits, thus mapping a Layer 2 frame 915 to the 256-bit data fields L2DATA of 13 Layer 1 messages 950 that are transmitted in 13 slots assigned to the HP-FDCCH.

Along with the data field L2DATA, each Layer 1 message 950 also includes a synchronization field SYNC, a reserved field RSVD, and a 32-bit Shared Channel Feedback (SCF) field SCF. The Layer 1 messages 950 are preferably transmitted using a burst of substantially the same transmit power as a conventional FDCCH burst but, unlike a conventional IS-136 FDCCH burst, the information in the SCF field SCF is the product of an additional coding that spreads reservation status information 935 over a plurality of HP-FDCCH slots and that can provide additional link margin to improve a receiving terminal's ability to recover the reservation status information 935 under low signal to noise ratio (SNR) conditions.

The channel reservation status information 935 may be generated in the same manner and have a format similar to that of SCF data included in a "regular" FDCCH burst, i.e., may include a busy/reserved/idle field BRI, a received/not received field R/N and a coded partial echo field CPE. Before inclusion in the Layer 1 messages 950, however, the channel reservation status information 935 is convolutionally coded by a rate ½, memory 5 punctured convolutional coder 940, and then block coded according to a (32,4) Hadamard-type code (i.e., a code representing a (16,4) Hadamard code with bit repetition) in a block coder 945. The coding maps the 27 bits of the reservation status information 935 into 13 32-bit block code words (416 bits), a respective one of which is included in the SCF field SCF of a respective Layer 1 message 950. In this manner, the channel reservation status information 935 is distributed across 13 HP-FDCCH slots. As illustrated in FIG. 10, operations 1000 for processing a received plurality of Layer 1 messages or bursts 950, include decoding the SCF fields SCF of the messages 950 by a (32,4) Hadamard-type block decoder 1010 and a rate ½ convolutional decoder 1015 to recover the original channel reservation status information 935.

The DCCH under the IS-136 standard currently specifies a 32-slot superfrarne structure, with a hyperframe including 2 superframes. As the high-penetration forward and reverse control channels described herein are transmitted over a plurality of slots, however, such a superframe/hyperframe structure may not be particularly desirable. Although the plurality of high-penetration bursts used for transmission of a reservation status indicator or an access request message as described above can be transmitted in immediate succession, improved performance can be obtained according to an aspect of the present invention, by spacing out these bursts to take advantage of time diversity. According to another aspect of the present invention, a tradeoff between time diversity and message delay can be achieved by defining superframe and hyperframe structures for the high-penetration forward control channels and the high-penetration reverse control channels, such that an individual access request or channel status reservation indicator is transmitted over a time period greater than the duration of one of the superframes and less than the duration of the hyperframe.

Figure 11A:
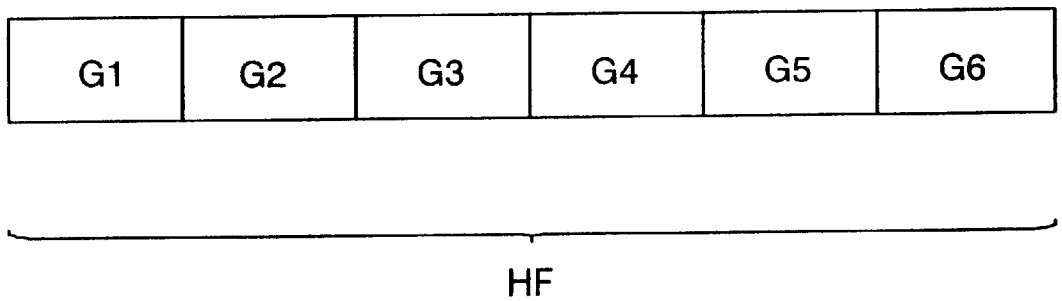
Figure 11B:
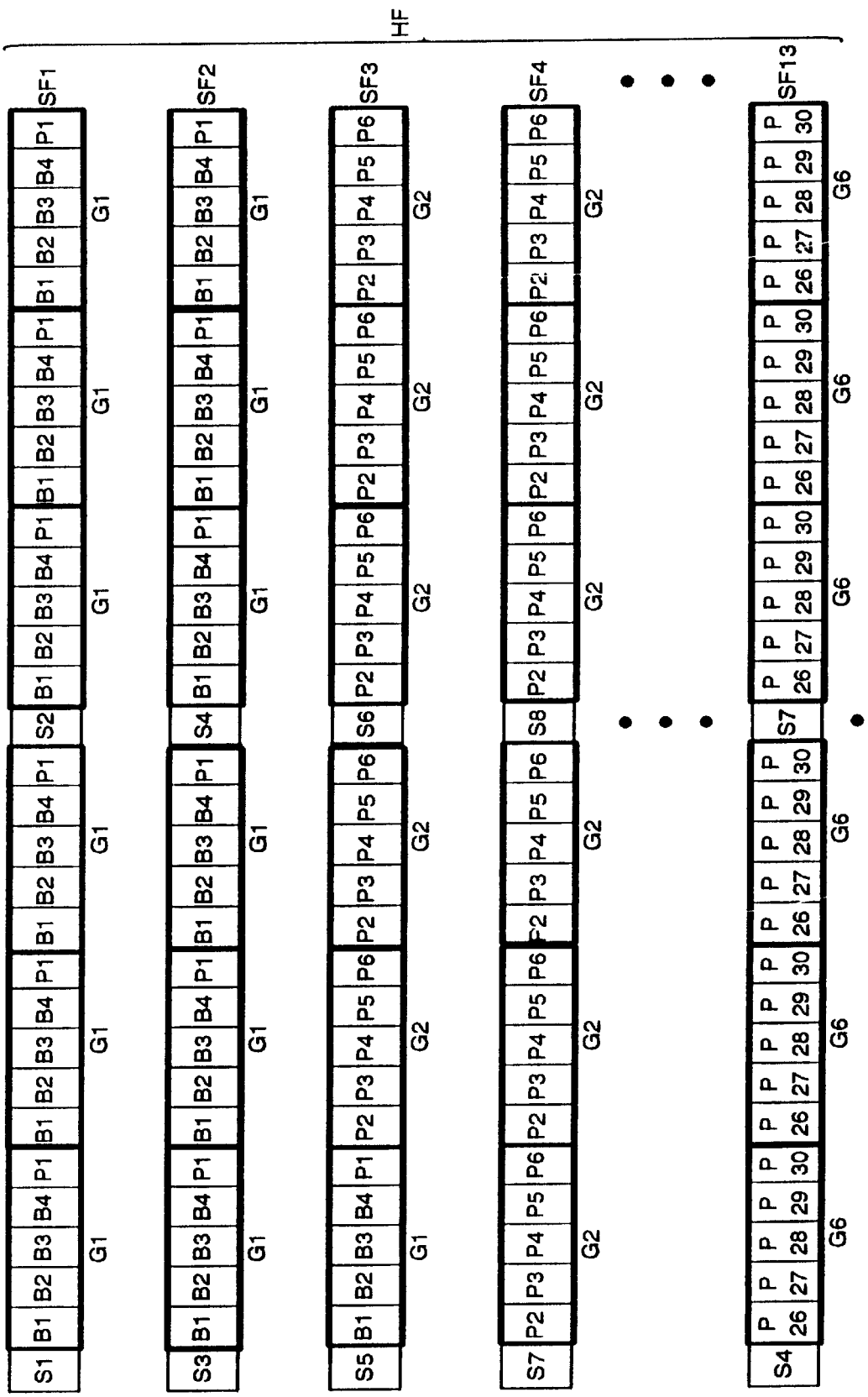

FIGS. 11A and 11B illustrate an example of such a superframe/hyperframe structure for a HP-FDCCH as described in FIG. 9. A hyperframe HF includes a plurality of superframes SF1–SF13, with each superframe SF1–SF13 including 32 frames, each of which is 20 msec. long. The hyperframe HF and superframes SF1–SF13 are defined on sequences of slots on one physical channel, i.e., one repeating time slot on a carrier frequency band (for purposes of illustration, it is assumed that the system operates in full rate mode, i.e., each carrier band is divided into repeating groups of 3 slots, i.e., three physical channels). Hence, each hyperframe HF comprises 32×13 slots=416 slots, 1 slot per 20 msec frame. Of these 416 slots, 26 slots are allocated for synchronization bursts S1–S8, as shown in FIG. 11B. The remaining 390 slots are divided into 6 successive groups G1–G6 of 65 slots each, with the synchronization slots S1–S8 being interspersed among the groups G1–G6.

Within a group G1–G6, the 65 slots are further subdivided into 5 interleaved subchannels, each including 13 slots. A first group G1 is subdivided into slots assigned to first, second, third and fourth broadcast control subchannels B1, B2, B3, B4, and a first paging subchannel P1. A second group G2 is subdivided into slots assigned to second, third, fourth, fifth and sixth paging subchannels P2, P3, P4, P5, P6. Similarly, a sixth group G6 is allocated to twenty-sixth, twenty-seventh, twenty-eighth, twenty-ninth and thirtieth paging subchannels P26, P27, P28, P29, P30.

For ease of reference, the group of 13 slots assigned to a subchannel may be viewed as a "HP-slot," a basic unit that reflects the expansion of an access request or channel reservation status indicator into 13 coded slots. The 13 slots of an HP-slot are spaced in a near uniform fashion, with consecutive slots being separated by 100 msec (except in cases where synchronization bursts are inserted), thus providing time diversity. Inordinate message delay can be avoided, however, as an individual reservation status indicator is transmitted within the duration of one of the groups G1–G6, e.g., within an interval of (without taking into account time for synchronization bursts) approximately 13×5×20 msec=1.3 sec., considerably less than the 8.32 sec. duration of the hyperframe HF.

Figure 12A:
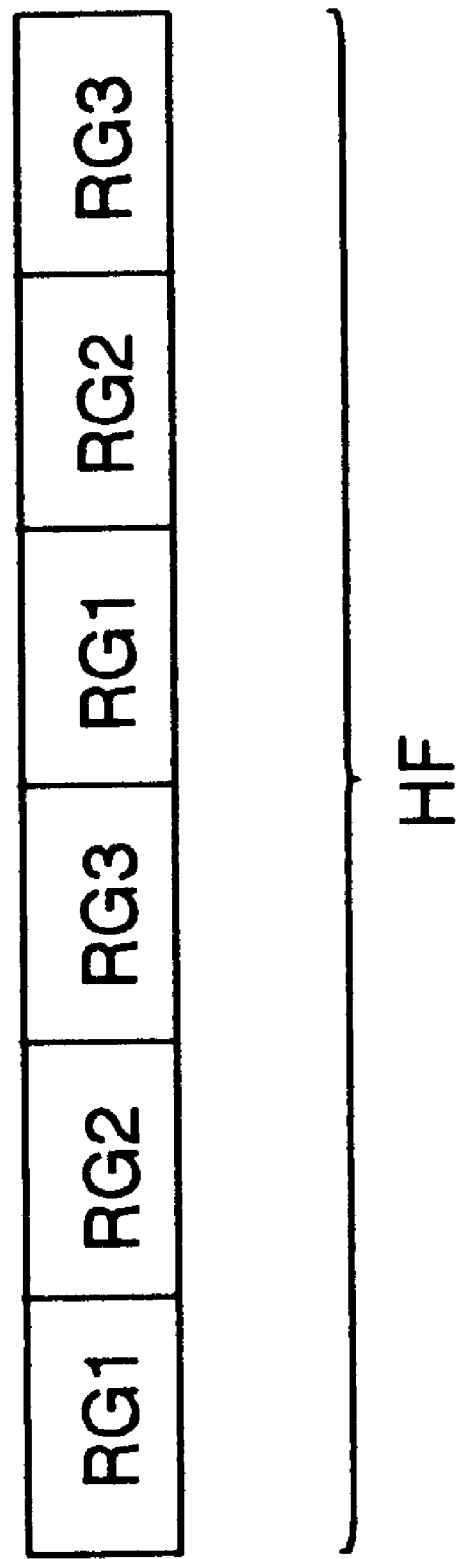
Figure 12B:
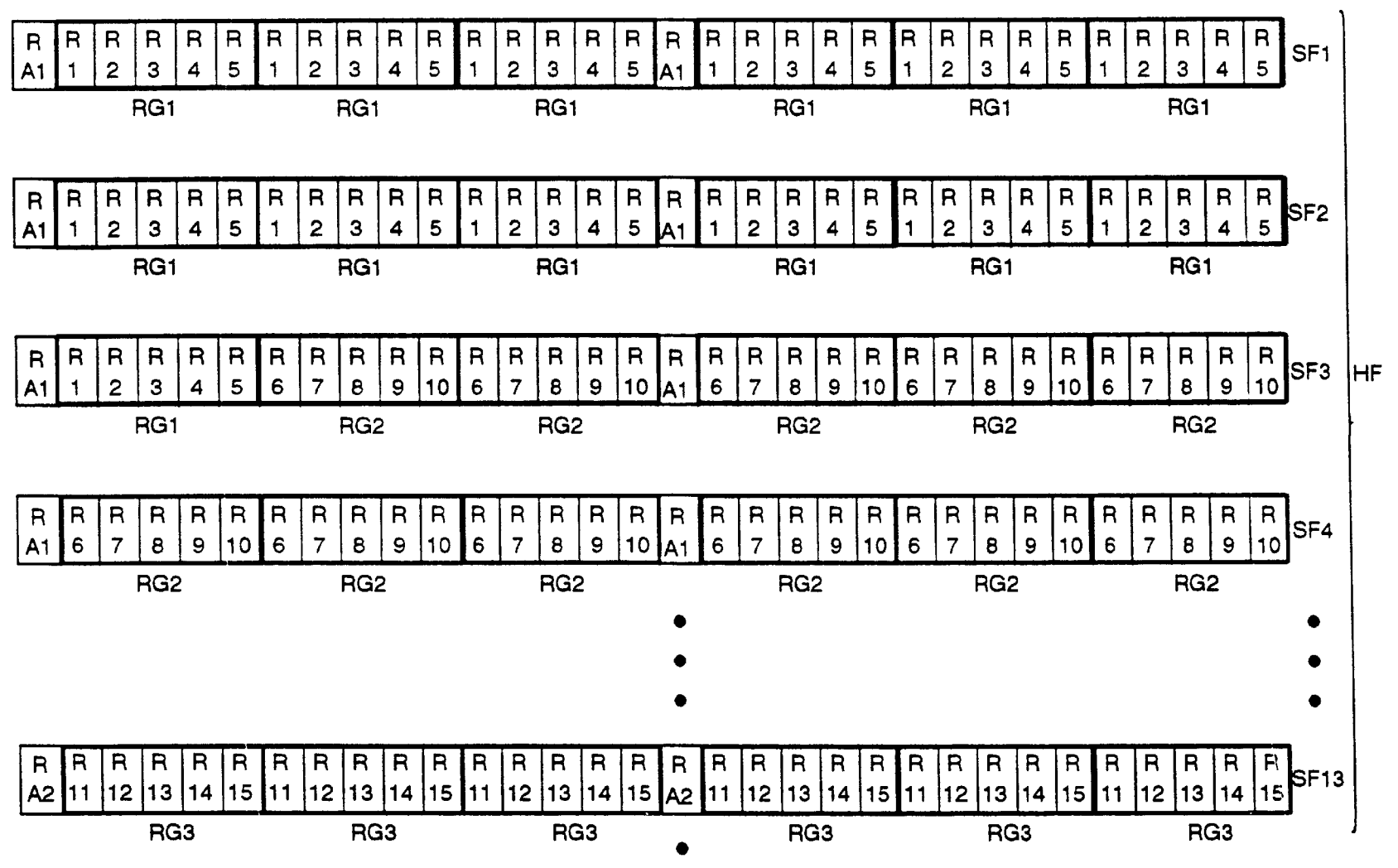
Figure 13:
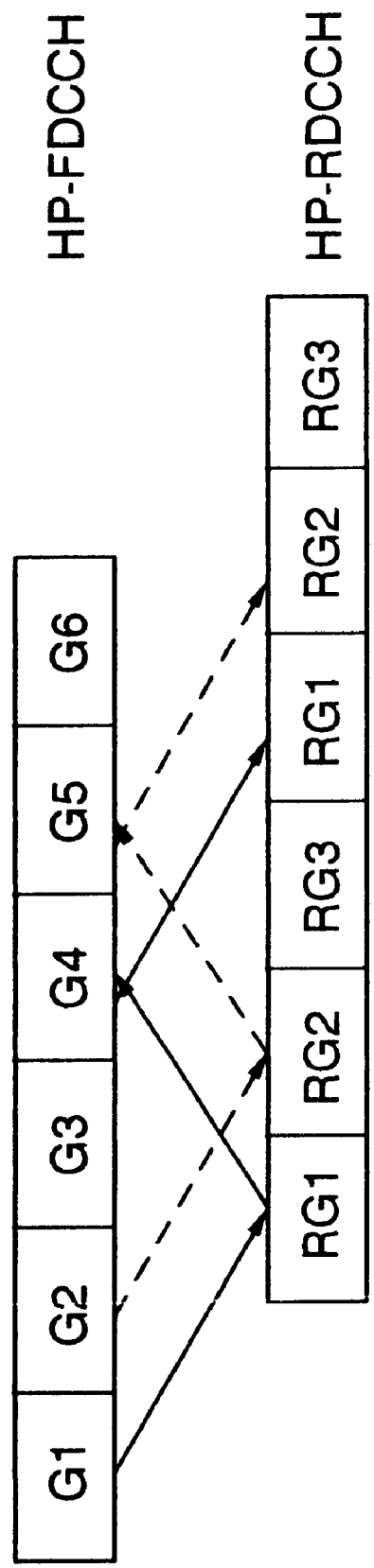
FIG. 13 illustrates subchannelling of high-penetration forward and reverse control channels according to an embodiment of the present invention.

A similar superframe/hyperframe structure is preferably used for the high-penetration reverse control channel, as illustrated in FIGS. 12A and 12B. Instead of six groups, three random access subchannel groups are defined, including a first group RG1 of subchannels R1–R5, a second group RG2 of subchannels R6–R1O, and a third group of subchannels R11–R15. With 5 subchannels in each group RG1–RG3, there are 15 total subchannels, each of which occur twice in an 8.32 sec period of a HPRDCCH hyperframe. The 2 HP-slots utilized for synchronization on the forward link are not required on the reverse link. On the reverse link, these 2 HP-slots may be used for two additional high-penetration random access subchannels RA1, RA2 that are independent of the other 30 subchannels. These additional subchannels may be set up such that the first subchannel RA1 corresponds to the first 13 synchronization slots of the HP-FDCCH, and the second subchannel RA2 corresponds to the second 13 synchronization slots of the HP-FDCCH. The two subchannels RA1, RA2 differ from the other subchannels R1–R15 in that each of these channels require approximately half of the superframe duration (4.15 sec.) to be transmitted and received. The protocol on the additional subchannels RA1, RA2 may be the same as one the other subchannels R1–R15, or these subchannels may be used for other purposes if the additional access request capacity is not required. Transmission on the reverse control channel is preferably delayed with respect to the forward channel such that a dialog like the one illustrated in FIG. 13 can be supported.

Figure 14:
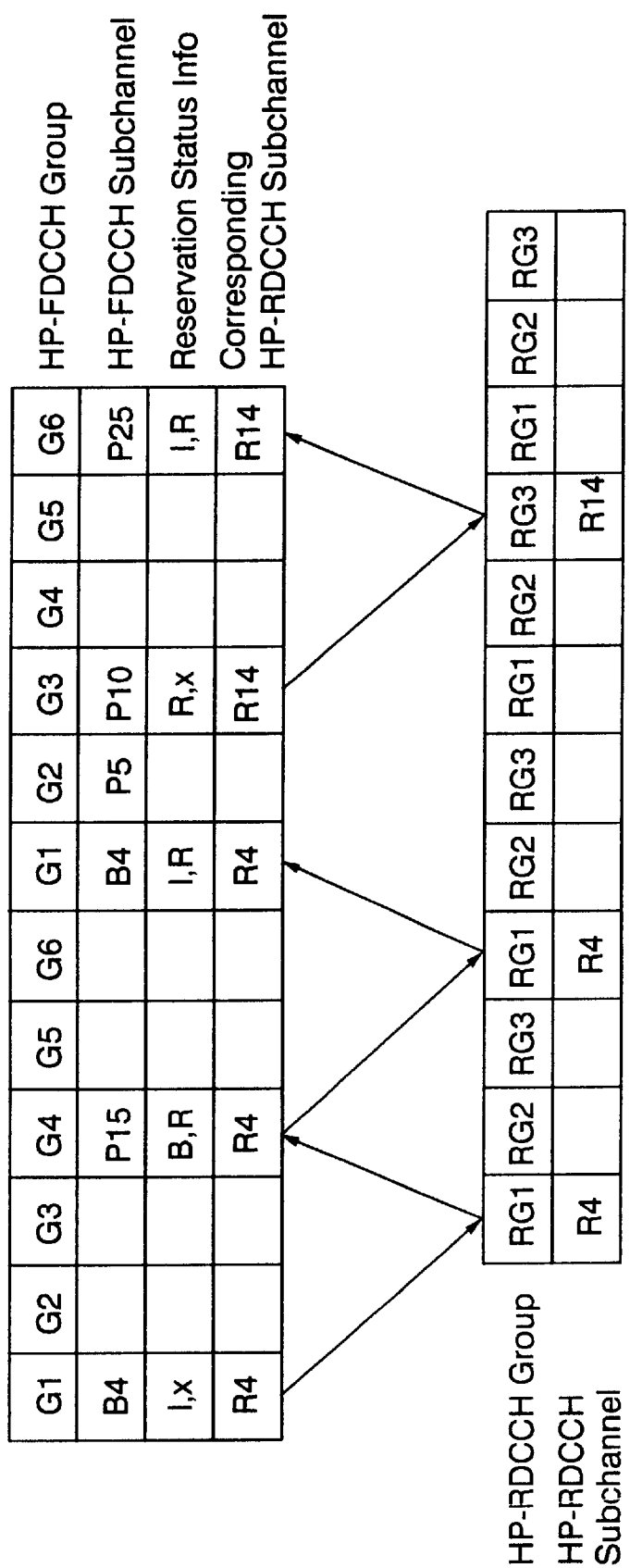
FIG. 14 illustrates exemplary dialog between a mobile terminal and a base station according to an embodiment of the present invention.

FIG. 14 illustrates an exemplary dialog between a mobile terminal and a base station using high-penetration access techniques according to the present invention. A mobile terminal wishing to make a contention-based access scans HP-FDCCH subchannels to find an available channel, eventually reading channel reservation status information transmitted over a broadcast control subchannel B4 that indicates that subchannel R4 in group RG1 is available. The mobile terminal then transmits a access request burst over a random access subchannel R4 of the group RG1. The mobile station then reads the next HP-slot P15 corresponding to the random access subchannel R4, checking to see if the channel reservation status information contained therein identifies the mobile terminal, e.g., includes a portion of the mobile terminal's MSID, indicating receipt of the access request by the base station. The mobile terminal then transmits a second burst on the random access subchannel R4, and then awaits an access response from the base station, for example, an Access Response Channel (ARCH) message transmitted over a forward subchannel P5. The mobile terminal can make a reservation-based access at the discretion of the base station, for example, when the mobile terminal reads reservation status information in a forward subchannel P10 that indicates that a reverse subchannel R14 is reserved for the mobile terminal (e.g., BRI="reserved" and CPE=portion of mobile terminal MSID).

Those skilled in the art will appreciate that numerous alternatives to and variations of the operations of FIGS. 8–14 fall within the scope of the present invention. For example, superframe and hyperframe structures other than those illustrated may be used, such as structures in which a high-penetration subchannel is transmitted on a plurality of consecutive slots, instead of in the interleaved manner illustrated. Subchannel groupings other than those illustrated may also be used. Those skilled in the art will also appreciate that the present invention is also applicable to systems other than the IS-136 compliant system illustrated.

Allocation of High-Penetration Services

Figure 15:
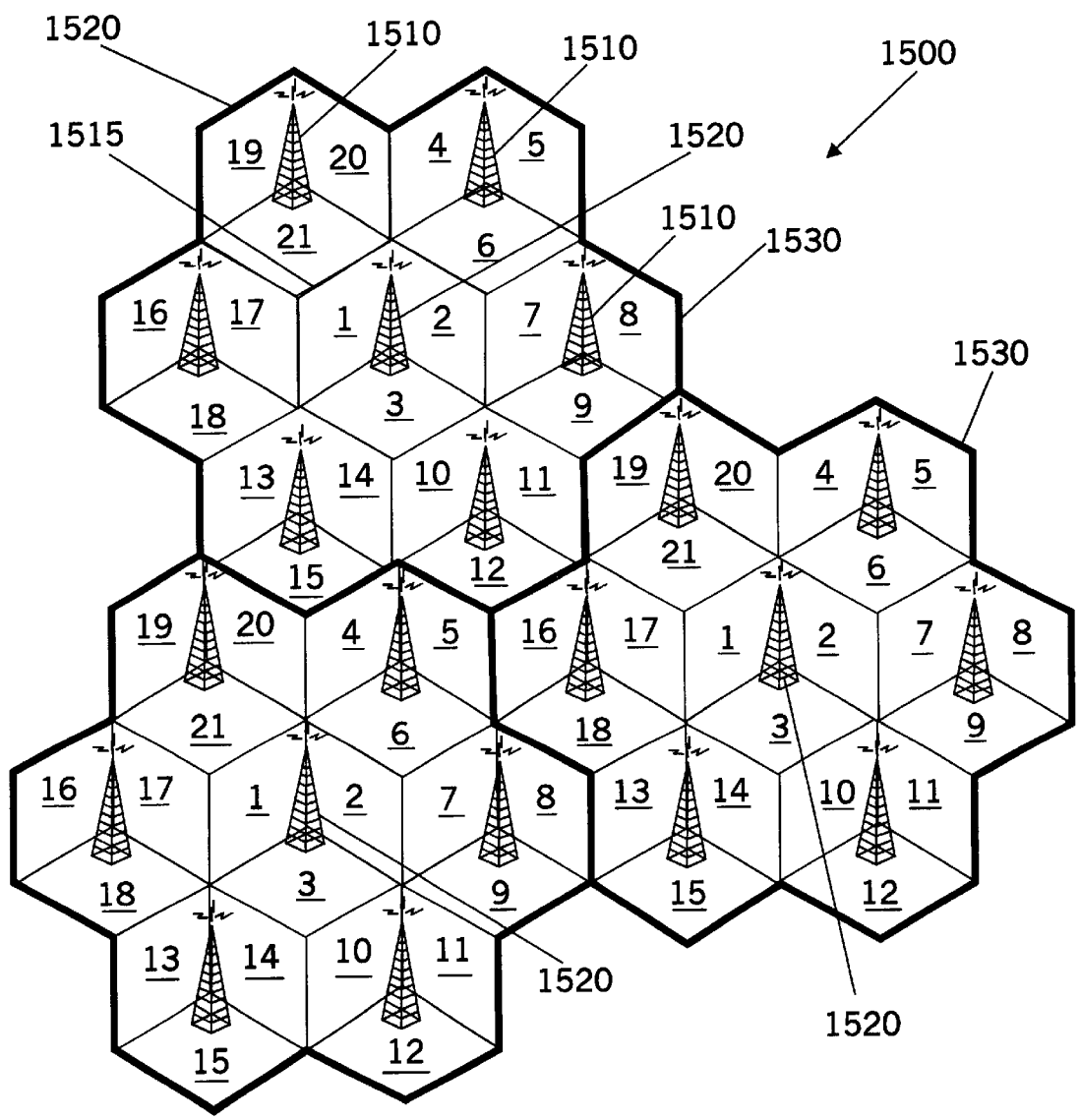
FIGS. 15 and 16 illustrate various high-penetration channel capacity allocations according to embodiments of the present invention.

Referring to FIG. 15, a wireless communications system 1500 includes a plurality of base stations 1510, including a subset of base stations 1520 that communicate with terminals over both regular control channels, such as the RDCCH and FDCCH of the IS-136 standard, and high-penetration control channels, such as the HP-RDCCH and HP-RDCCH described above. In particular, FIG. 15 illustrates base stations 1510, 1520 serving cells (sectors) 1–21 organized into groups 1530, e.g., frequency reuse, code reuse or other types of groups, each of which includes a base station 1520 that communicates on a high-penetration control channel. The base stations 1510, 1520 communicate control information over regular control channels in cells 1–21, providing regular control channel service in a regular coverage area (cell) 1515. Each of the subset base stations 1520 also communicates over high-penetration control channels in sectors 1,2,3 of a regular cellular coverage area 1515 served by the regular control channels used by the base station 1520. Because of the increased margin associated with these high-penetration channels, the high-penetration channels of a base station 1520 of the subset may actually communicate with terminals in an area greater than the regular coverage area 1515 served by the regular control channels provided by the base station 1520.

A wireless communications system with distributed high-penetration services, such as the system 1500 of FIG. 15, can provide effective high-penetration service coverage without using an inordinate amount of channel capacity. Assuming an IS-136 compliant system deployed within a 25 MHz band in full rate mode and using a 7:21 frequency reuse pattern such as that illustrated in FIG. 15, approximately 19 carrier frequency bands are assigned to each sector served by a base station 1510, 1520, with three repeating slots on each carrier frequency band. Thus, a total of 57 physical channels are available within each sector, at least one of which is assigned to a regular DCCH. If each base station 1510 communicated over a high-penetration DCCH (HP -DCCH) as well, $1/57^{th}$ of the potential voice capacity of the system would be rendered unavailable for voice traffic. In contrast, by limiting communication over HP-DCCHs to base stations 1520 of a subset of a plurality of base stations 1510, 1520 as shown in FIG. 15, the number of physical channels used for the HP-DCCHs may be reduced by a factor of 7, such that one out of 399 channels is used for HP-DCCHs.

The extra link margin associated with the high-penetration control channels can effectively provide a range extension in, for example, rural or suburban areas that contain relatively few radio-attenuating structures or landforms. A high-penetration control channel used by the base station 1520 can serve a coverage area significantly larger than the regular control channel cellular coverage area 1515 for the base station 1520. For example, using a high-penetration control channel as described above can result in an approximately 10 dB gain for high-penetration control channels in comparison to regular control channels, a high-penetration control channel can serve an area approximately coextensive with the regular cellular coverage areas served by all of the base stations of a group 1530.

Figure 16:
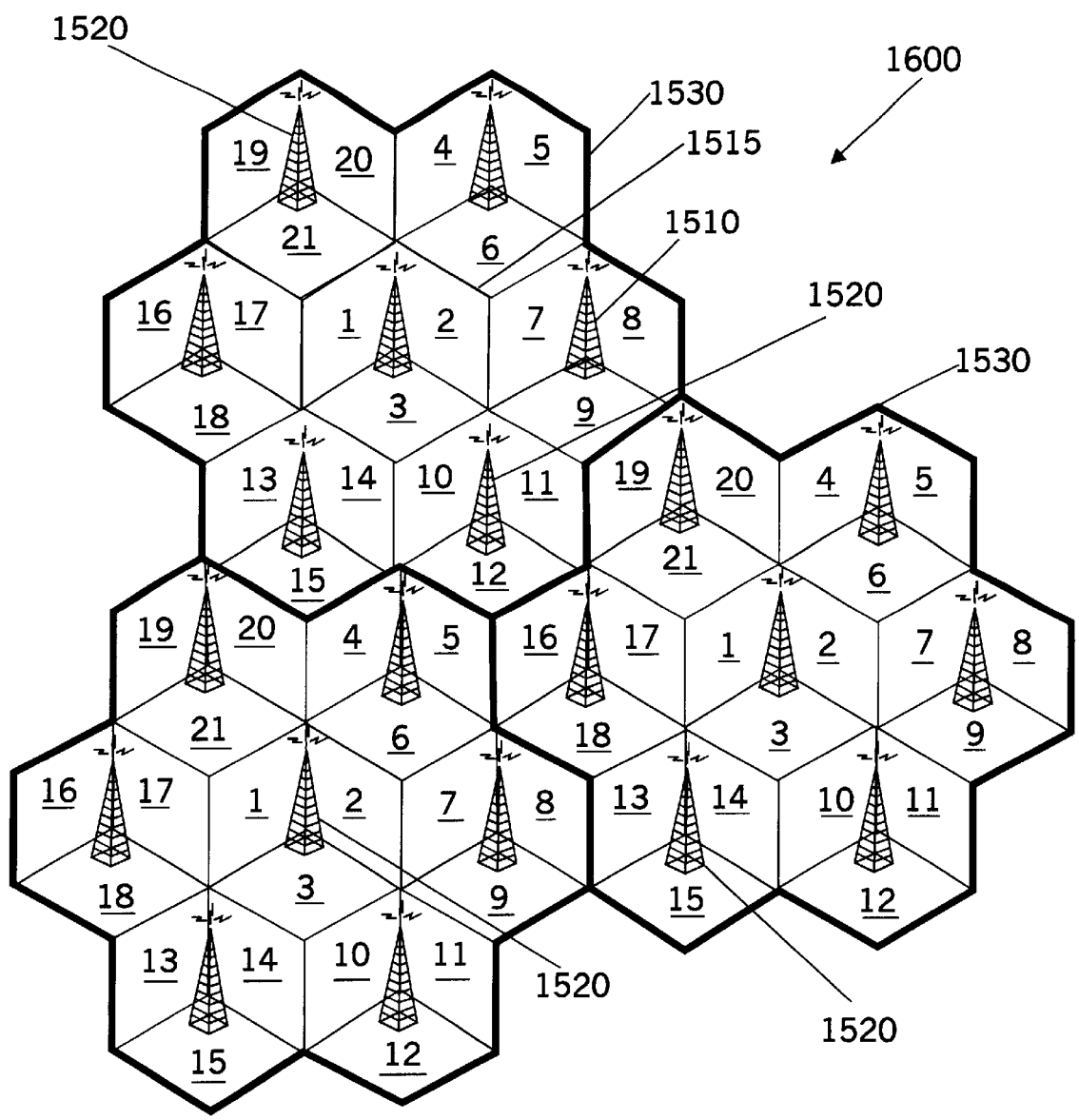

In some urban or suburban areas in which enhanced service is to be provided to obstructed locations such as building interiors, however, it may be preferable to more densely distribute base stations that provide high-penetration control channels. As illustrated in FIG. 16, base stations 1520 communicating over both regular and high-penetration control channels are distributed more densely than the groups 1530, such that some of the reuse groups 1530 have more than one base station 1520 communicating over high-penetration control channels. In cases where the extra link margin introduced by the increased redundancy of the high-penetration control channels is such that the effective coverage areas of the base stations 1520 overlap, it is preferable to utilize different sets of carrier frequency bands for high-penetration channels used by adjacent ones of the base stations 1520 to reduce co-channel interference. For the illustrated system 1600 of FIG. 16 this means that HP-DCCHs are transmitted on more frequencies than the system 1500 of FIG. 15. The increased density of high-penetration services leads to an increase in the number of physical channels used for the high-penetration control channels, i.e., for the illustrated IS-136 embodiment of FIG. 16, one out of 228 channels would be used for HP-DCCHs.

It will be understood that, in general, a wireless communication system such as the systems of FIG. 15 and 16 can be configured to provide varying densities of base stations providing high-penetration services. For example, portions of a wireless communications system can be configured with a lower density of high-penetration services as in FIG. 15, while other portions of the system are configured with a higher-density of high-penetration services as illustrated in FIG. 16. The base stations supporting high-penetration services may also be capable of being enabled or disabled from providing high-penetration services so that the high-penetration services provided by the wireless system could be dynamically reconfigured to compensate, for example, for changes in radio propagation conditions or system loading.

The aforementioned U.S. patent application Ser. No. 09/193,261(Rydbeck et al., filed Nov. 18, 1998), U.S. patent application Ser. No. 09/195,790(Rydbeck et al., filed Nov. 18, 1998), and U.S. patent application Ser. No. 09/195,315 (Khayrallah et al., filed Nov. 18, 1998) describe transmission of high-penetration short messages over a HP-DCCH, e.g., in SMS subchannels of a forward HP-DCCH. However, some users may want to send high-penetration messages at a faster rate than may be available using the extended HP-FDCCH/HP-RDCCH frame structure described above. According to an aspect of the present invention, users needing higher message transfer rates may be assigned to a dedicated high-penetration messaging channel mapped onto a traffic channel.

Figure 17:
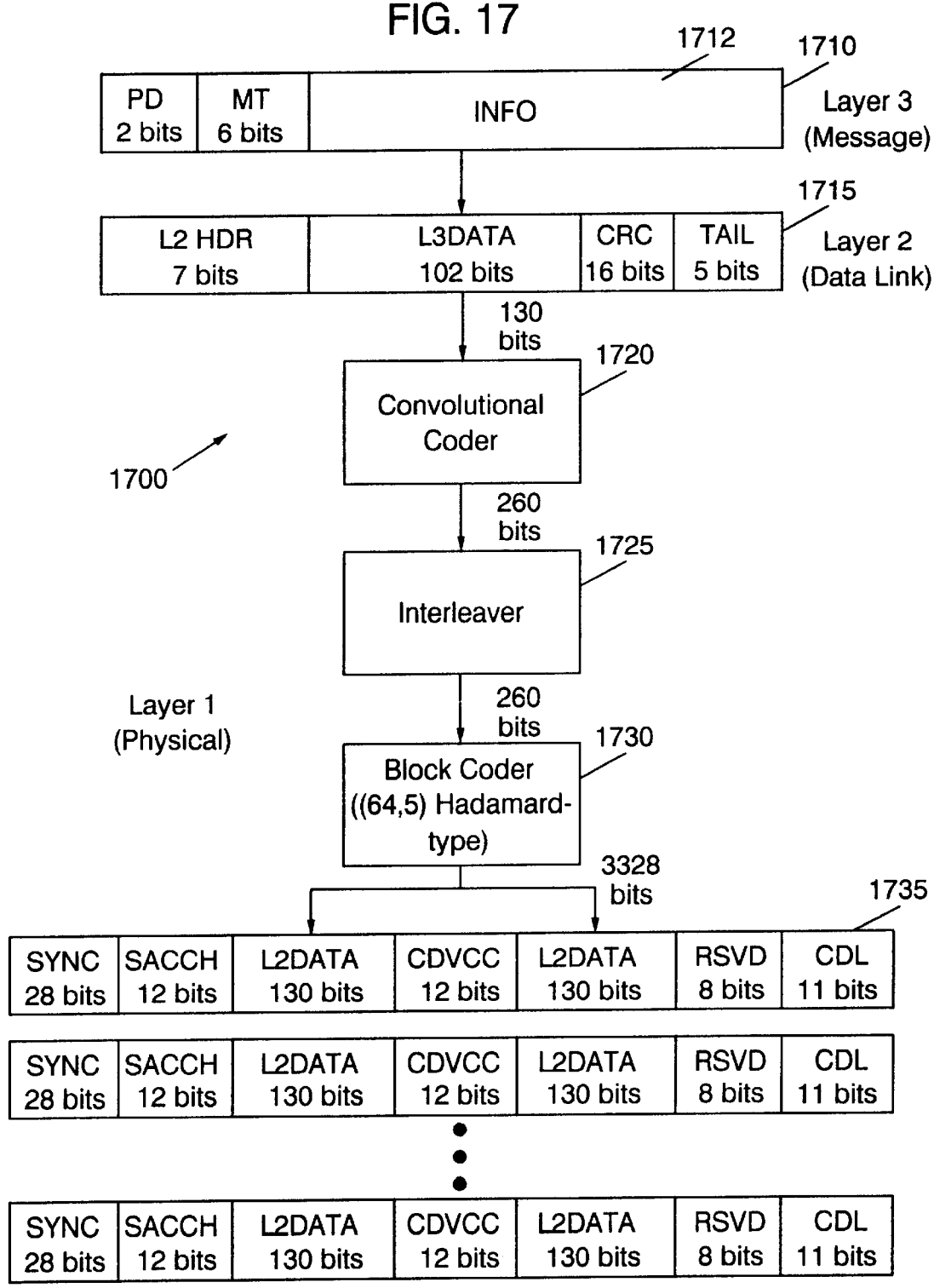
FIGS. 17 and 18 illustrate exemplary operations for communicating high-penetration messages over a digital traffic channel according to an aspect of the present invention.

FIG. 17 illustrates exemplary operations 1700 for constructing Layer 1 (Physical Layer) messages for transmission in a plurality of slots assigned to a high-penetration traffic channel used for message transport rather than voice, more particularly, for constructing a plurality of Layer 1 messages 1735 for a forward (base station to terminal) High-Penetration Traffic Channel (HP-TCH) consistent with the IS-136 standard. A Layer 3 (Message Layer) message 1710 includes information 1712, along with a Protocol Discriminator (PD) field PD and a Message Type (MT) field MT. The Layer 3 message is included in a data field L3DATA of a Layer 2 (Data Link Layer) frame 1715, which also includes Layer 2 Header L2HDR, a Cyclic Redundancy Check (CRC) value CRC, and tail bits TAIL. Each Layer 2 frame 1715 is then processed by a rate ½, memory 5 convolutional coder 1720, and then interleaved by an interleaver 1725. The convolutionally coded and interleaved information is then subjected to an additional block coding in a block coder 1730, preferably a (64, 5) Hadamard-type block coder (i.e., a coder implementing a (32,5) Hadamard code with bit repetition), to produce data that is placed into data fields L2DATA of a plurality of Layer 1 messages 1735. Also included in each Layer 1 message 835 are a Synchronization field SYNC, Slow Associated Control Channel (SACCH) field SACCH, a Digital Verification Color Code field CDVCC, a reserved field RSVD, and a Coded DCCH Locator field CDL.

As shown, the block coder 1730 maps the 260 bits of convolutionally coded and interleaved Layer 2 data into 3328 bits of block coded data (38 64-bit block code words). This additional coding can provide increased link margin for the transmitted information on the order of 10 dB. As each Layer 1 message 1735 includes only 260 bits of data, each Layer 2 message 1715 requires at least 13 Layer 1 messages 1735, i.e., at least 13 bursts in at least 13 slots.

Figure 18:
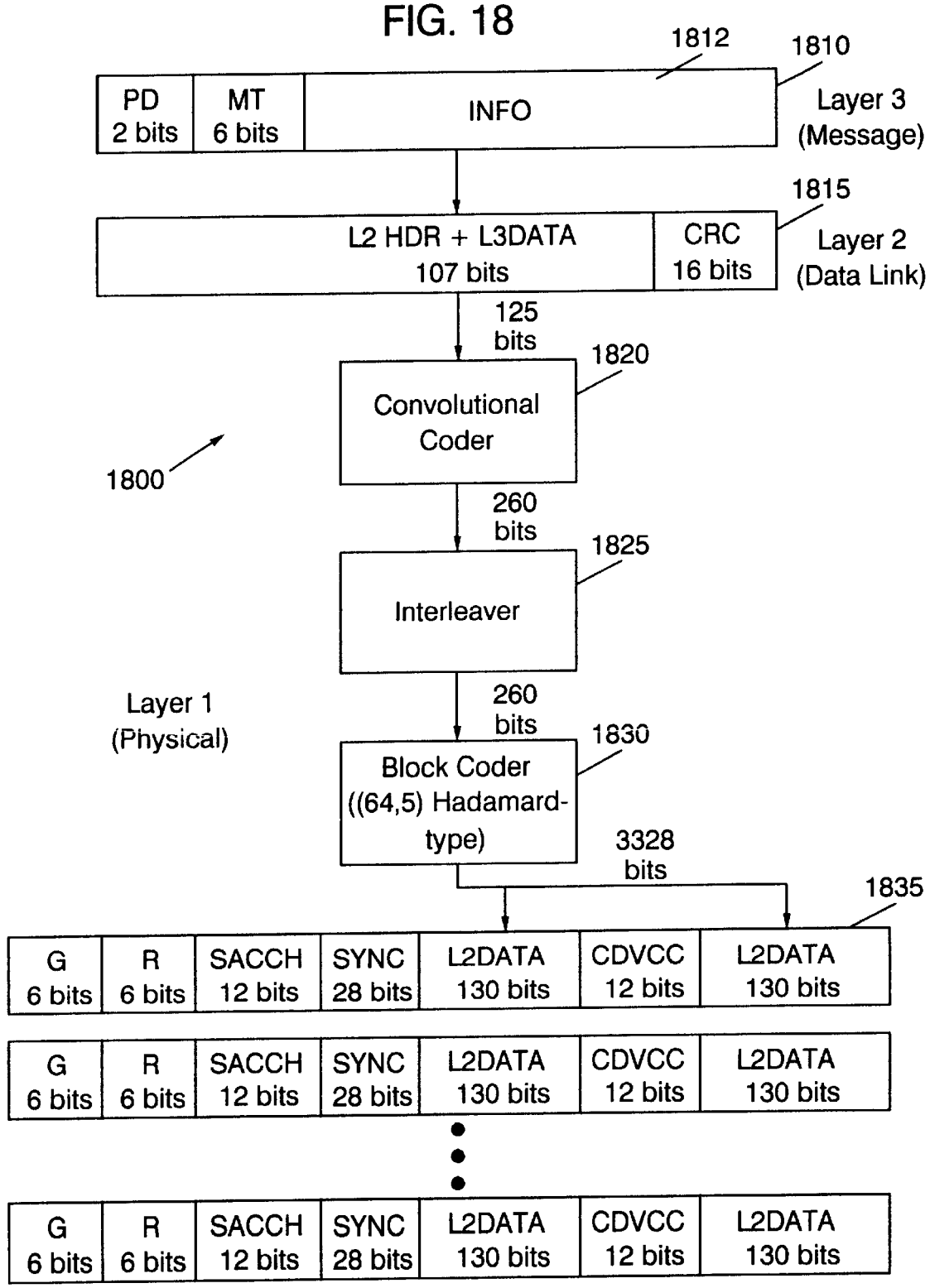

A similar protocol can be used in the reverse direction, as illustrated in FIG. 18. Operations 1800 for constructing a plurality of Layer 1 messages 1835 for a reverse (terminal to base station) High-Penetration Traffic Channel (HP-TCH) consistent with the IS-136 standard. A Layer 3 (Message Layer) message 1810 includes information 1812, along with a Protocol Discriminator (PD) field PD and a Message Type (MT) field MT. The Layer 3 message and Level 2 header information L2HDR+L3DATA are included along with a CRC value CRC in a Layer 2 (Data Link Layer) frame 1815. Each Layer 2 frame 1715 is then processed by a rate ½, memory 5 convolutional coder 1820, and then interleaved by an interleaver 1825. The convolutionally coded and interleaved information is then subjected to an additional block coding in a block coder 1830, preferably a (64, 5) Hadamard-type block coder as described above, to produce data that is placed into data fields L2DATA of a plurality of Layer 1 messages 1835. Also included in each Layer 1 essage 1835 are a guard bit field G, a ramp field R, synchronization fields SYNC, SYNC+, and a Color Code field CDVCC.

As shown, the block coder 1830 maps the 260 bits of convolutionally coded and interleaved Layer 2 data into 3328 bits of block coded data (38 64-bit block code words). This additional coding can provide increased link margin for the transmitted information on the order of 10 dB. As each Layer 1 message 1835 includes only 260 bits of data, each Layer 2 message 1815 requires at least 13 Layer 1 messages 1835, i.e., at least 13 bursts in at least 13 slots.

As can seen from FIG. 17, a standard IS-136 traffic channel format is used on the forward HP-TCH, with encoded message data simply going into the data fields normally used for voice information. Using such dedicated messaging channels, a total of 125 Layer 2 bits may be transmitted on the forward or reverse channels in a period of 13 20 msec slots, or 260 msec, a much higher rate than would be available on the HP-FDCCH and HP-RDCCH using the expanded hyperframe/superframe described above.

Figure 19:
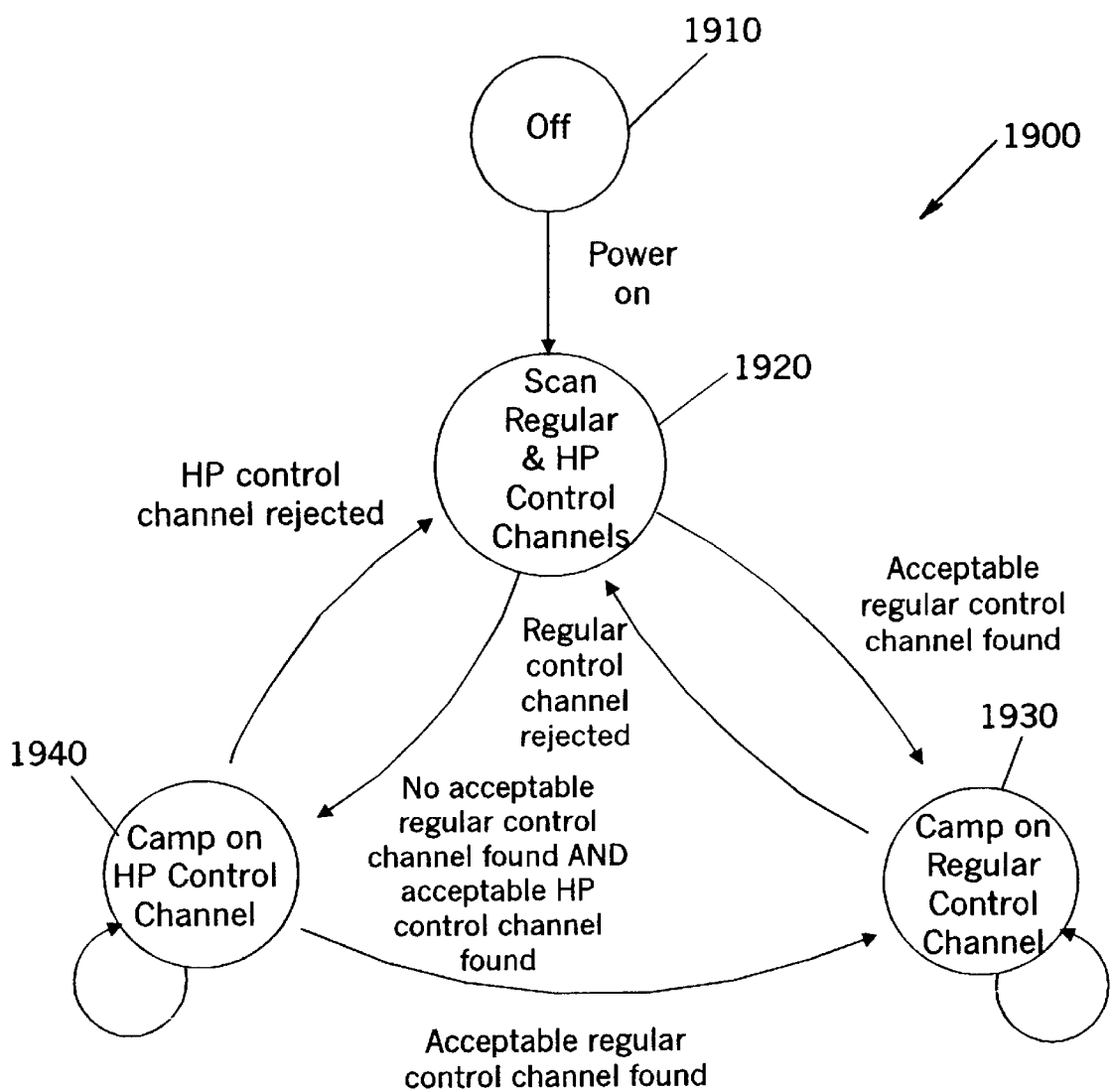
FIG. 19 illustrates exemplary operations for selecting among regular and high-penetration control channels according to an aspect of the present invention.

FIG. 19 is a state transition diagram that illustrates exemplary operations 1900 for operating a terminal in a system providing regular and high-penetration control channel, according to another aspect of the present invention. Upon power-up from an off state 1910, the terminal goes to a scanning state 1920, where it scans for an acceptable DCCH. If one is found, the terminal transitions to a DCCH camping state 1930. If no acceptable DCCH can be found, however, the terminal looks for an acceptable HP-DCCH, and transitions to an HP-DCCH camping state 1940 when an acceptable HP-DCCH is found.

When a terminal is camped on a particular regular or high-penetration control channel, e.g., an DCCH or HP-DCCH, it preferably receives information identifying candidate DCCHs and HP-DCCHs, e.g., neighboring DCCHs and neighboring HP-DCCHs. While in the DCCH camping state 1930, the terminal may scan the candidate DCCHs, looking for a candidate DCCH having better communications quality. If the terminal finds a better DCCH, it camps on the new DCCH. If the current DCCH becomes unacceptable and no other candidate DCCH is acceptable, the terminal may transition back to the scanning state 1920, where it scans for an acceptable DCCH or HP-DCCH. While camped in on a HP-DCCH, a terminal may also scan candidate DCCHs and HP-DCCHs. If an acceptable DCCH is found, the terminal transitions to the DCCH camping state 1930. If a better HP-DCCH is found, the terminal camps on the better HP-DCCH. If the current HP-DCCH is rejected and no suitable candidate is available, the terminal returns to the scanning state 1920. It will be appreciated that the operations 1900 of FIG. 19 may be performed, for example, by the transceiver 700 of FIG. 7, or by similar apparatus. Those skilled in the art will also appreciate that the operations described in reference to FIG. 19 are exemplary, and that alternatives to and variations of these operations may be used with the present invention.

According to an aspect of the present invention, candidate high-penetration control channels are identified using an extension of the IS-136 Neighbor Cell Message. The IS-136 standard defines a Neighbor Cell Message that may be transmitted over the Extended Broadcast Channel (E-BCCH) of the DCCH. This Neighbor Cell Message includes a Neighbor Cell List identifying DCCHs of neighboring cells. Such a Neighbor Cell Message may also be broadcast over a high-penetration control channel, e.g., over HP-DCCHs transmitted by the base stations 1520 of FIGS. 15 and 16. The information transmitted over these HP-DCCHs may also include information identifying neighbor HP-DCCHs, in addition to neighbor DCCHs.

Although one technique for implementing this could be to create a special "HP Neighbor Cell Message" along the lines of the Neighbor Cell Message defined in IS- 136, it is preferable to modify use of the existing Neighbor Cell Message such that a predetermined number of the DCCHs identified in the Neighbor Cell List of the existing IS-136 message identify DCCHs transmitted by base stations that also transmit HP-DCCHs. The DCCH and HP-DCCH transmitted by such a base station preferably are transmitted on succeeding slots of a common carrier frequency band, allowing the Neighbor Cell List in the Neighbor Cell Message to also identify candidate HP-DCCHs because of the frequency relationship between the DCCHs and the HP-DCCHs. Thus, for example, a terminal camped on a HP-DCCH that has received such a Neighbor Cell Message can scan the DCCHs supplied in the neighbor list and, if it fails to find an acceptable DCCH, can then scan the frequencies of the predetermined number of identified DCCHs for an acceptable HP-DCCH.

An advantageous aspect of the present invention can be illustrated by considering a terminal positioned in a location with marginal regular control channel coverage, such that no regular control channel is available on a consistent basis. Assuming the terminal is camped on high-penetration control channel as described above, the terminal, upon receipt of a "seemingly" acceptable regular control channel, may monitor the new regular control channel to see if it will stabilize over a time interval (the time interval may be predetermined, for example, or may be sent as a parameter over a control channel), If the new channel stabilizes, the terminal can release the high-penetration control channel and switch to camping on the new regular control channel. If, however, the new control channel fails to exhibit the requisite stability, the terminal remains on the high-penetration control channel. Implementation of such a "qualification period" for acceptance of a new regular control channel may be facilitated by the use of the expanded superframe/hyperframe structure described above for the high-penetration control channel, which affords ample time for channel qualification because of long hyperframe duration.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A wireless communications system, comprising:
   a plurality of base stations that communicate with terminals over physical channels,
   wherein said plurality of base stations communicate control information with terminals at a first redundancy level over regular control channels mapped onto said physical channels, and wherein said plurality of base stations includes a subset of base stations that also communicate control information with terminals at a second redundancy level greater than said first redundancy level over high-penetration control channels mapped onto said physical channels.

2. A system according to claim 1, wherein a base station of said plurality of base stations provides a voice service to a terminal accessing the system via a regular control channel, and wherein a base station of said subset of said plurality of base stations provides a message service to a terminal accessing the system via a high-penetration control channel.

3. A system according to claim 2, wherein a base station of said subset of said plurality of base stations provides a message service over a high-penetration forward control channel.

4. A system according to claim 3, wherein a base station of said subset of said plurality of base stations provides a message service over a traffic channel.

5. A system according to claim 1:
   wherein each of said plurality of base stations transmit control information on a regular forward control channel at said first redundancy level; and
   wherein each base station of said subset of said plurality of base stations is further operative to transmit control information on a high-penetration forward control channel at said second redundancy level.

6. A system according to claim 5, wherein a base station of said subset of said plurality of base stations transmits information identifying a high-penetration forward control channel transmitted by another base station of said subset of said plurality of base stations.

7. A system according to claim 6, wherein a base station of said subset of said plurality of base stations transmits information identifying a regular forward control channel transmitted by another base station of said plurality of base stations.

8. A system according to claim 5, wherein a base station of said subset of said plurality of base stations transmits control information on a forward control channel and a high-penetration control channel at substantially the same power levels.

9. A system according to claim 1, wherein a base station of said subset of said plurality of base stations communicates over a regular control channel with terminals located in a first coverage area and communicates over a high-penetration control channel with terminals located in a second coverage area larger than said first coverage area.

10. A system according to claim 1:
    wherein said plurality of base stations serve cells that are grouped into a plurality of groups, such that a respective group of base stations serves a respective set of cells; and
    wherein said subset of said plurality of base stations comprises at least one base station from group of base stations.

11. A system according to claim 10, wherein base stations of said subset of said plurality of base stations communicate over high-penetration control channels mapped onto a common set of carrier frequency bands.

12. A system according to claim 10, wherein base stations of said subset of said plurality of base stations are geographically distributed with a greater density than said groups of cells.

13. A system according to claim 12, wherein adjacent base stations of said subset of said plurality of base stations communicate over high-penetration control channels mapped onto different sets of carrier frequency bands.

14. A system according to claim 1, wherein each base station of said plurality of base stations is operative to be enabled or disabled for communication over a high-penetration control channel such that said subset of said plurality of base station can be dynamically altered.

15. A system according to claim 1, wherein a base station of said subset of said plurality of base stations transmits a regular forward control channel and a high-penetration forward control channel on a respective first and second physical channels on a common carrier frequency band.

16. A system according to claim 1:
    wherein said plurality of base stations communicate control information with terminals over Digital Control Channels (DCCHs) at the first redundancy level; and
    wherein base stations of said subset of said plurality of base stations communicate control information with terminals over high-penetration Digital Control Channels (HP-DCCHs) at the second redundancy level.

17. A system according to claim 16, wherein said DCCHs comprise at least one of a forward DCCH (FDCCH) and a reverse DCCH (RDCCH).

18. A system according to claim 17, wherein a base station of said plurality of base stations provides a voice service to a terminal accessing the system via a DCCH, and wherein a base station of said subset of said plurality of base stations provide a message service to a terminal accessing the system via a HP-DCCH.

19. A system according to claim 18, wherein a base station of said subset of said plurality of base stations provides a message service over a high-penetration Traffic Channel (HP-TCH).

20. A terminal for communicating with a wireless communications system over physical channels, the terminal comprising:

a receiver operative to receive control information transmitted over a plurality of regular control channels and high-penetration control channels, said receiver operative to receive control information at a first redundancy level over said regular control channels and to receive control information at a second redundancy level greater than said first redundancy level over said high-penetration control channels; and a controller operatively associated with said receiver and operative to scan said receiver over the plurality of regular and high-penetration control channels and to camp said receiver on a selected regular or high-penetration forward control channel based on a measure of communications quality.

21. A terminal according to claim 20, wherein said receiver is operative to receive information over a regular or a high-penetration control channel that identifies a plurality of candidate regular and high-penetration control channels, and wherein said controller is operative to scan said receiver over said plurality of candidate regular and high-penetration control channels.

22. A terminal according to claim 21, wherein said controller is operative to transition said receiver to camping on one of the candidate regular control channels when communications quality for said one candidate regular control channel meets a predetermined criteria.

23. A terminal according to claim 22, wherein said controller is operative to transition said receiver from camping on a first regular control channel to camping on a second regular control channel selected from the plurality of candidate regular and high-penetration control channels when communications quality for said second regular control channel exceeds communications quality for said first regular control channel.

24. A terminal according to claim 21, wherein said controller is operative to transition said receiver from camping on a regular control channel to camping on a high-penetration control channel selected from said plurality of candidate regular and high-penetration control channels when communications quality for the regular control channel and for the candidate regular control channels of the plurality of regular and high-penetration control channels is unacceptable.

25. A terminal according to claim 21, wherein said controller is operative to transition said receiver from camping on a high-penetration control channel to camping on one of the candidate regular control channels when communications quality on the candidate regular control channel meets a predetermined criteria.

26. A terminal according to claim 20:
wherein said receiver and said controller are operative to receive a voice service from the wireless communications system when camped on a regular control channel; and
wherein said receiver and said controller are operative to receive a message service from the wireless communications system when camped on a high-penetration control channel.

27. A terminal according to claim 26, wherein said receiver and said controller are operative to receive message data over a high-penetration control channel.

28. A terminal according to claim 26, wherein said receiver and said controller are operative to receive message data over a traffic channel when camped on a high-penetration control channel.

29. A terminal according to claim 20:
wherein said receiver is operative to receive control information over a plurality of Digital Control Channels (DCCHs) at the first redundancy level and over a plurality of high-penetration Digital Control Channels (HP-DCCHs) at the second redundancy level; and
wherein said controller is operative to scan said receiver over the pluralities of DCCHs and HP-DCCHs to camp said receiver on a selected DCCH or HP-DCCH based on a measure of communications quality.

30. A terminal according to claim 29, wherein said receiver and said controller are operative to receive voice service when camped on a DCCH, and wherein said receiver and said controller receive a message service when camped on a HP-DCCH.

31. A terminal according to claim 30, wherein said receiver and said controller are operative to receive said message service over a high-penetration Traffic Channel (HP-TCH).

32. A method of operating a wireless communications system comprising a plurality of base stations operative to communicate over physical channels, the method comprising the steps of:
communicating control information between the plurality of base stations and terminals at a first redundancy level over regular control channels mapped onto the physical channels; and
communicating control information between a subset of the plurality of base stations and terminals at a second redundancy level greater than the first redundancy level over high-penetration control channels mapped onto the physical channels.

33. A method according to claim 32, further comprising the steps of:
providing a voice service to a terminal accessing the system via a regular control channel; and
providing a message service to a terminal accessing the system via a high-penetration control channel.

34. A method according to claim 33, wherein said step of providing a message service comprises the step of providing a message service over a high-penetration forward control channel.

35. A method according to claim 33, wherein said step of providing a message service comprises the step of providing a message service over a traffic channel.

36. A method according to claim 32:
wherein said step of communicating control information over a regular control channel comprises the step of transmitting control information on a regular forward control channel at the first redundancy level; and
wherein said step of communicating control information over a high-penetration control channel comprises the step of transmitting control information on a high-penetration forward control channel at the second redundancy level.

37. A method according to claim 36, wherein said step of transmitting control information on a regular forward control channel comprises the step of transmitting information identifying a high-penetration forward control channel transmitted by a base station of the subset of the plurality of base stations.

38. A method according to claim 36, wherein said step of transmitting control information on a high-penetration control channel comprises the step of transmitting information identifying a high-penetration forward control channel transmitted by a base station of the subset of the plurality of base stations.

39. A method according to claim 36, wherein control information transmitted over the regular control channel and control information transmitted over the high-penetration control channel is transmitted at substantially the same power level.

40. A method according to claim 32, further comprising the steps of;
communicating between a base station of the subset of the plurality of base stations and terminals located in a first coverage area over a regular control channel; and
communicating between the base station of the subset of the plurality of base stations and terminals located in a second coverage area larger than the first coverage area over a high-penetration control channel.

41. A method according to claim 32:
wherein the plurality of base stations serve cells grouped into a plurality of groups, such that a respective group of base stations serves a respective group of cells; and
wherein the subset of the plurality of base stations comprises at least one base station from group of base stations.

42. A method according to claim 41, wherein said step of communicating between a subset of the plurality of base stations and terminals comprises the step of communicating between the subset of the plurality of base stations and terminals over high-penetration control channels mapped onto a common set of carrier frequency bands.

43. A method according to claim 41, wherein the subset of the plurality of base stations are geographically distributed with a greater density than the groups of cells.

44. A method according to claim 32, comprising the step of dynamically changing the subset of the plurality of base stations and terminals communicating with terminals over high-penetration control channels.

45. A method according to claim 36, wherein a regular forward control channel and a high-penetration forward control channel transmitted by a base station of the subset of the plurality of base stations are mapped onto respective first and second physical channels on a common carrier frequency band.

46. A method according to claim 32:
wherein said step of communicating between the plurality of base stations and terminals comprises the step of communicating control information between the plurality of base stations and terminals over Digital Control Channels (DCCHs) at the first redundancy level; and
wherein said step of communicating between the subset of the plurality of base station and terminals comprises the step of communicating control information between the subset of the plurality of base stations and terminals over high-penetration Digital Control Channels (HP-DCCHs) at the second redundancy level.

47. A method according to claim 46, wherein the DCCHs comprise at least one of a forward DCCH (FDCCH) and a reverse DCCH (RDCCH), and wherein the HP-DCCHs comprise at least one of a forward HP-DCCH (HP-FDCCH) and a reverse HP-DCCH (HP-RDCCH).

48. A method of operating a terminal for communicating with a wireless communications system over physical channels, the method comprising the steps of:
scanning a plurality of regular control channels over which control information is transmitted at a first redundancy level and a plurality of high-penetration control channels over which control information is transmitted at a second redundancy level greater than the first redundancy level; and
camping on a selected regular or high-penetration forward control channel based on a measure of communications quality.

49. A method according to claim 48, wherein said step of scanning is preceded by the step of receiving information over a regular or a high-penetration control channel that identifies a plurality of candidate regular and high-penetration control channels, and wherein said step of scanning comprises the step of scanning the plurality of candidate regular and high-penetration control channels.

50. A method according to claim 49, further comprising the step of transitioning to camping on one of the candidate regular control channels when communications quality for the one candidate regular control channel meets a predetermined criteria.

51. A method according to claim 50, wherein said step of transitioning comprises the step of transitioning from camping on a first regular control channel to camping on a second regular control channel selected from the plurality of candidate regular and high-penetration control channels when communications quality for the second regular control channel exceeds communications quality for the first regular control channel.

52. A method according to claim 49, further comprising the step of transitioning from camping on a regular control channel to camping on a high-penetration control channel selected from the plurality of candidate regular and high-penetration control channels when communications quality for the regular control channel and for the candidate regular control channels of the plurality of regular and high-penetration control channels is unacceptable.

53. A method according to claim 49, further comprising the step of transitioning from camping on a high-penetration control channel to camping on one of the candidate regular control channels when communications quality on the candidate regular control channel meets a predetermined criteria.

54. A method according to claim 48, further comprising the steps of:
communicating voice information with the wireless communications system when camped on a regular control channel; and
communicating message data with the wireless communications system when camped on a high-penetration control channel.

55. A method according to claim 54, wherein said step of communicating message data comprises the step of receiving message data over a high-penetration control channel.

56. A method according to claim 54, wherein said step of communicating message data comprises the step of communicating message data over a traffic channel.

57. A method according to claim 48:
wherein said step of scanning comprises. the step of scanning a plurality of forward Digital Control Channels (FDCCHs) and high-penetration forward Digital Control Channels (HP-FDCCHs); and
wherein said step of camping comprises the step of camping on a selected FDCCH or HP-FDCCH based on a measure of communications quality.

58. A method according to claim 57, further comprising the steps of:
receiving a voice service when camped on a DCCH; and
receiving a message service when camped on a HP-DCCH.

59. A method according to claim 58, further comprising the step of receiving the message service over a high-penetration Traffic Channel (HP-TCH).

60. A wireless communications system, comprising:

a plurality of base stations that communicate with terminals over physical channels, wherein said plurality of base stations communicate control information with terminals at a first redundancy level over regular control channels mapped onto said physical channels, and wherein said plurality of base stations includes a subset of base stations that also communicate control information with terminals at a second redundancy level greater than said first redundancy level over high-penetration control channels mapped onto said physical channels while at least one of said plurality of base stations is constrained to not provide high-penetration control channels.

61. A method of operating a wireless communications system comprising a plurality of base stations operative to communicate over physical channels, the method comprising the steps of:

communicating control information between the plurality of base stations and terminals at a first redundancy level over regular control channels mapped onto the physical channels; and communicating control information between a subset of the plurality of base stations and terminals at a second redundancy level greater than the first redundancy level over high-penetration control channels mapped onto the physical channels while constraining at least one other of the plurality of base stations to not support high-penetration control channels.

* * * * *